(12) United States Patent
Wu et al.

(10) Patent No.: US 11,923,984 B2
(45) Date of Patent: Mar. 5, 2024

(54) METHOD AND DEVICE IN A NODE USED FOR WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 404 days.

(21) Appl. No.: 17/386,551

(22) Filed: Jul. 28, 2021

(65) Prior Publication Data

US 2021/0359791 A1    Nov. 18, 2021

Related U.S. Application Data

(63) Continuation of application No. PCT/CN2021/071395, filed on Jan. 13, 2021.

(30) Foreign Application Priority Data

Jan. 16, 2020   (CN) .......................... 202010048990.1

(51) Int. Cl.
*H04L 1/16*       (2023.01)
*H04L 1/1607*     (2023.01)
(Continued)

(52) U.S. Cl.
CPC .......... *H04L 1/1671* (2013.01); *H04L 5/0007* (2013.01); *H04L 5/0055* (2013.01); *H04W 72/569* (2023.01)

(58) Field of Classification Search
CPC ........................... H04L 5/0055; H04L 1/1812
(Continued)

(56) References Cited

U.S. PATENT DOCUMENTS

2018/0279274 A1    9/2018  Sun et al.
2019/0230688 A1*   7/2019  Huang ................. H04L 5/0057
(Continued)

FOREIGN PATENT DOCUMENTS

CN         110266450 A      9/2019

OTHER PUBLICATIONS

ISR in application PCT/CN2021/071395 dated Mar. 25, 2021.
(Continued)

*Primary Examiner* — Kiet M Doan

(57) ABSTRACT

A first node monitors first-type signalings and second-type signalings in a first time-frequency resource pool, and receives a first signaling; and transmits a first information block. A second field comprised in each first-type signaling indicates a first priority, while a second field comprised in each second-type signaling indicates a second priority; when the first signaling is one of the first-type signalings, a value of a first field comprised in the first signaling is related to both a number of the first-type signalings and a number of the second-type signalings transmitted in the first time-frequency resource pool; when the first signaling is one of the second-type signalings, a value of a first field comprised in the first signaling is related to the number of the second-type signalings transmitted in the first time-frequency resource pool, rather than the number of the first-type signalings transmitted in the first time-frequency resource pool.

20 Claims, 6 Drawing Sheets

(51) Int. Cl.
  *H04L 5/00* (2006.01)
  *H04W 72/566* (2023.01)
(58) Field of Classification Search
  USPC .......................................................... 455/522
  See application file for complete search history.

(56) References Cited

U.S. PATENT DOCUMENTS

2020/0077432 A1* 3/2020 Xiong ................... H04L 5/0092
2021/0266106 A1* 8/2021 Yan ....................... H04L 1/1822

OTHER PUBLICATIONS

"Discussion on HARQ-ACK feedback over PUCCH and PUSCH", 3GPP Draft; R1-1810596 Discussion on HARQ-ACK Feedback Over PUCCH and PUSCH, 3rd Generation Partnership Project(3GPP), Mobile Competence Centre ;650,Route Des Lucioles ;F-06921 Sophia-Antipolis CEvol.RAN WG1,No. Chengdu, China; Oct. 8, 2018-Oct. 12, 2018 Sep. 28, 2018(Sep. 28, 2018), pp. 1-5.
CN202010048990.1 1st Office Action dated Nov. 30, 2021.
CN202010048990.1 First Search Report dated Nov. 22, 2021.
3Gpp TSG_RAN_WG1 RAN1 R1-1812387 DLUL scheduling and HARQ for URLLC Nov. 3, 2018.
3Gpp TSG_RAN_WG1 RAN1 R1-1810667_URLLC HARQ-ACK enh_final Sep. 29, 2018.

* cited by examiner

METHOD AND DEVICE IN A NODE USED FOR WIRELESS COMMUNICATION

CROSS REFERENCE TO RELATED APPLICATIONS

This application is a continuation of International Application No. PCT/CN2021/071395, filed Jan. 13, 2021, claims the priority benefit of Chinese Patent Application No. 202010048990.1, filed on Jan. 16, 2020, the full disclosure of which is incorporated herein by reference.

BACKGROUND

Technical Field

The present disclosure relates to transmission methods and devices in wireless communication systems, and in particular to a method and device of radio signal transmission in a wireless communication system that support cellular networks.

Related Art

In a 5G system, Enhance Mobile Broadband (eMBB) and Ultra Reliable and Low Latency Communication (URLLC) are two typical traffic types. Targeting requirements for lower target BLER of URLLC traffic, a new Modulation and Coding Scheme (MCS) table has been defined in 3rd Generation Partner Project (3GPP) New Radio (NR) Release 15. For the purpose of supporting more demanding Ultra Reliable and Low Latency Communication (URLLC) traffics in 5G system, for example, with higher reliability (e.g., a target BLER is 10^-6) or with lower delay (e.g., 0.5-1 ms), in the 3GPP NR Release 16, a DCI signaling can indicate a scheduled PDSCH is of Low Priority or High Priority, wherein the Low Priority corresponds to URLLC traffics, while the High Priority corresponds to eMBB traffics. When a low-priority transmission overlaps with a high-priority transmission in time domain, the high-priority one is performed, and the low-priority one is dropped.

A Work Item (WI) of URLLC enhancement in NR Release 17 was approved at the 3GPP RAN #86 Plenary, and a focus of study in this WI is multiplexing of various Intra-UE (that is, User Equipment) traffics with different priorities.

SUMMARY

In order to support multiplexing of Intra-UE traffics with different priorities, a key issue of how to design Hybrid Automatic Repeat reQuest (HARQ) Codebook needs to be solved.

To address the above problem, the present disclosure provides a solution. It should be noted that though the present disclosure only took the uplink for example in the statement above, it is also applicable to other scenarios of downlink and sidelink, where similar technical effects can be achieved. Additionally, the adoption of a unified solution for various scenarios contributes to the reduction of hardcore complexity and costs. It should be noted that if no conflict is incurred, embodiments in a UE in the present disclosure and the characteristics of the embodiments are also applicable to a base station, and vice versa. What's more, the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:
monitoring first-type signalings and second-type signalings in a first time-frequency resource pool, and receiving a first signaling; and
transmitting a first information block;
herein, the first information block comprises a HARQ-ACK associated with the first signaling; each of the first-type signalings and the second-type signalings comprises a first field; and each of the first-type signalings and the second-type signalings comprises a second field, the second field comprised by each of the first-type signalings indicates a first priority, and the second field comprised by each of the second-type signalings indicates a second priority, the first priority being different from the second priority; when the first signaling is one of the first-type signalings, a value of the first field comprised in the first signaling is related to both a number of the first-type signalings and a number of the second-type signalings transmitted in the first time-frequency resource pool; when the first signaling is one of the second-type signalings, a value of the first field comprised in the first signaling is related to the number of the second-type signalings transmitted in the first time-frequency resource pool, and unrelated to the number of the first-type signalings transmitted in the first time-frequency resource pool.

In one embodiment, a key problem to be solved in the present disclosure is how to design HARQ Codebook to support Intra-UE traffics with different priorities.

In one embodiment, a problem to be solved in the present disclosure is that: in LTE and NR systems, Downlink Assignment Index (DAI) is employed in cellular link transmissions to determine a HARQ feedback codebook, thereby enhancing the efficiency of HARQ feedback and avoiding disagreement between both sides of communications over interpretations of the HARQ feedback codebook. To provide better support for transmissions of various priorities, reconsideration ought to be paid to DAI.

In one embodiment, the essence of the above method lies in that a first priority and a second priority are respectively High Priority and Low Priority, first-type signalings schedule URLLC traffics and second-type signalings schedule eMBB traffics, According to one aspect of the present disclosure, the above method is characterized in comprising:
receiving a second signaling in the first time-frequency resource pool;
herein, the first signaling is one of the first-type signalings, and the second signaling is one of the second-type signalings; a first sub-information-block comprises the HARQ-ACK associated with the first signaling, and the first sub-information-block belongs to the first information block, while a second sub-information-block comprises a HARQ-ACK associated with the second signaling; the first signaling indicates a first time-frequency resource block, while the second signaling indicates a second time-frequency resource block, the first time-frequency resource block being reserved for the first sub-information-block, and the second time-frequency resource block being reserved for the second sub-information-block; whether a time unit to which the first time-frequency resource block belongs in time domain is overlapped with a time unit to which the second time-frequency resource block belongs in time domain is used for determining whether the first information block comprises the second sub-information-block, or, whether the first time-frequency resource block is overlapped with the second time-frequency resource block in time domain is used for determining whether the first information block comprises the second sub-information-block.

According to one aspect of the present disclosure, the above method is characterized in comprising:

receiving L1-1 first-type signaling(s) in a first signaling set other than the first signaling and L2-1 second-type signaling(s) in a second signaling set other than the second signaling in the first time-frequency resource pool;

herein, the first signaling set is composed of L1 first-type signalings detected in the first time-frequency resource pool, and the first signaling is a last first-type signaling in the first signaling set, L1 being a positive integer greater than 1; the first sub-information-block comprises L1 information sub-blocks, and the L1 first-type signalings respectively correspond to the L1 information sub-blocks, the L1 information sub-blocks respectively comprising HARQ-ACKs associated with corresponding first-type signalings; the second signaling set is composed of L2 second-type signalings detected in the first time-frequency resource pool, and the second signaling is a last second-type signaling in the second signaling set, L2 being a positive integer greater than 1; the second sub-information-block comprises L2 information sub-blocks, and the L2 second-type signalings respectively correspond to the L2 information sub-blocks, the L2 information sub-blocks respectively comprising HARQ-ACKs associated with corresponding second-type signalings.

According to one aspect of the present disclosure, the above method is characterized in that the first information block is transmitted in the first time-frequency resource block.

According to one aspect of the present disclosure, the above method is characterized in that when the first signaling is one of the first-type signalings, the first signaling comprises a third field; a value of the third field comprised in the first signaling is related to a number of the first-type signalings transmitted in the first time-frequency resource pool, and unrelated to a number of the second-type signalings transmitted in the first time-frequency resource pool.

According to one aspect of the present disclosure, the above method is characterized in comprising:

receiving a first bit block set;

herein, the first signaling comprises scheduling information of the first bit block set; the HARQ-ACK associated with the first signaling indicates whether each bit block in the first bit block set is correctly received.

According to one aspect of the present disclosure, the above method is characterized in that the first signaling is used for indicating Semi-Persistent Scheduling Release, and the HARQ-ACK associated with the first signaling indicates whether the first signaling is correctly received.

The present disclosure provides a method in a second node for wireless communications, comprising:

transmitting a first signaling in a first time-frequency resource pool; and receiving a first information block;

herein, the first information block comprises a HARQ-ACK associated with the first signaling; the first time-frequency resource pool is reserved for first-type signalings and second-type signalings; each of the first-type signalings and the second-type signalings comprises a first field; and each of the first-type signalings and the second-type signalings comprises a second field, the second field comprised by each of the first-type signalings indicates a first priority, and the second field comprised by each of the second-type signalings indicates a second priority, the first priority being different from the second priority; when the first signaling is one of the first-type signalings, a value of the first field comprised in the first signaling is related to both a number of the first-type signalings and a number of the second-type signalings transmitted in the first time-frequency resource pool; when the first signaling is one of the second-type signalings, a value of the first field comprised in the first signaling is related to the number of the second-type signalings transmitted in the first time-frequency resource pool, and unrelated to the number of the first-type signalings transmitted in the first time-frequency resource pool.

According to one aspect of the present disclosure, the above method is characterized in comprising:

transmitting a second signaling in the first time-frequency resource pool;

herein, the first signaling is one of the first-type signalings, and the second signaling is one of the second-type signalings; a first sub-information-block comprises the HARQ-ACK associated with the first signaling, and the first sub-information-block belongs to the first information block, while a second sub-information-block comprises a HARQ-ACK associated with the second signaling; the first signaling indicates a first time-frequency resource block, while the second signaling indicates a second time-frequency resource block, the first time-frequency resource block being reserved for the first sub-information-block, and the second time-frequency resource block being reserved for the second sub-information-block; whether a time unit to which the first time-frequency resource block belongs in time domain is overlapped with a time unit to which the second time-frequency resource block belongs in time domain is used for determining whether the first information block comprises the second sub-information-block, or, whether the first time-frequency resource block is overlapped with the second time-frequency resource block in time domain is used for determining whether the first information block comprises the second sub-information-block.

According to one aspect of the present disclosure, the above method is characterized in comprising:

transmitting L1-1 first-type signaling(s) in a first signaling set other than the first signaling and L2-1 second-type signaling(s) in a second signaling set other than the second signaling in the first time-frequency resource pool;

herein, the first signaling set is composed of L1 first-type signalings detected in the first time-frequency resource pool, and the first signaling is a last first-type signaling in the first signaling set, L1 being a positive integer greater than 1; the first sub-information-block comprises L1 information sub-blocks, and the L1 first-type signalings respectively correspond to the L1 information sub-blocks, the L1 information sub-blocks respectively comprising HARQ-ACKs associated with corresponding first-type signalings; the second signaling set is composed of L2 second-type signalings detected in the first time-frequency resource pool, and the second signaling is a last second-type signaling in the second signaling set, L2 being a positive integer greater than 1; the second sub-information-block comprises L2 information sub-blocks, and the L2 second-type signalings respectively correspond to the L2 information sub-blocks, the L2 information sub-blocks respectively comprising HARQ-ACKs associated with corresponding second-type signalings.

According to one aspect of the present disclosure, the above method is characterized in that the first information block is transmitted in the first time-frequency resource block.

According to one aspect of the present disclosure, the above method is characterized in that when the first signaling is one of the first-type signalings, the first signaling comprises a third field; a value of the third field comprised in the first signaling is related to a number of the first-type signalings transmitted in the first time-frequency resource pool, and unrelated to a number of the second-type signalings transmitted in the first time-frequency resource pool.

According to one aspect of the present disclosure, the above method is characterized in comprising:

transmitting a first bit block set;

herein, the first signaling comprises scheduling information of the first bit block set; the HARQ-ACK associated with the first signaling indicates whether each bit block in the first bit block set is correctly received.

According to one aspect of the present disclosure, the above method is characterized in that the first signaling is used for indicating Semi-Persistent Scheduling Release, and the HARQ-ACK associated with the first signaling indicates whether the first signaling is correctly received.

The present disclosure provides a first node for wireless communications, comprising:

a first receiver, monitoring first-type signalings and second-type signalings in a first time-frequency resource pool, and receiving a first signaling; and a first transmitter, transmitting a first information block;

herein, the first information block comprises a HARQ-ACK associated with the first signaling; each of the first-type signalings and the second-type signalings comprises a first field;

and each of the first-type signalings and the second-type signalings comprises a second field, the second field comprised by each of the first-type signalings indicates a first priority, and the second field comprised by each of the second-type signalings indicates a second priority, the first priority being different from the second priority; when the first signaling is one of the first-type signalings, a value of the first field comprised in the first signaling is related to both a number of the first-type signalings and a number of the second-type signalings transmitted in the first time-frequency resource pool; when the first signaling is one of the second-type signalings, a value of the first field comprised in the first signaling is related to the number of the second-type signalings transmitted in the first time-frequency resource pool, and unrelated to the number of the first-type signalings transmitted in the first time-frequency resource pool.

The present disclosure provides a second node for wireless communications, comprising:

a second transmitter, transmitting a first signaling in a first time-frequency resource pool; and a second receiver, receiving a first information block;

herein, the first information block comprises a HARQ-ACK associated with the first signaling; the first time-frequency resource pool is reserved for first-type signalings and second-type signalings; each of the first-type signalings and the second-type signalings comprises a first field; and each of the first-type signalings and the second-type signalings comprises a second field, the second field comprised by each of the first-type signalings indicates a first priority, and the second field comprised by each of the second-type signalings indicates a second priority, the first priority being different from the second priority; when the first signaling is one of the first-type signalings, a value of the first field comprised in the first signaling is related to both a number of the first-type signalings and a number of the second-type signalings transmitted in the first time-frequency resource pool; when the first signaling is one of the second-type signalings, a value of the first field comprised in the first signaling is related to the number of the second-type signalings transmitted in the first time-frequency resource pool, and unrelated to the number of the first-type signalings transmitted in the first time-frequency resource pool.

In one embodiment, the method in the present disclosure has the following aspects:

The present disclosure proposes a scheme of HARQ Codebook design in support of multiplexing of Intra-UE traffics of varied priorities.

The present disclosure proposes a scheme of DAI design for transmissions supporting traffics of different priorities.

As shown in the method proposed herein, the eMBB HARQ Codebook can be multiplexed with URLLC HARQ Codebook, thus avoiding a failure in transmission of eMBB HARQ feedback resulting from dropping of low-priority HARQ transmissions.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
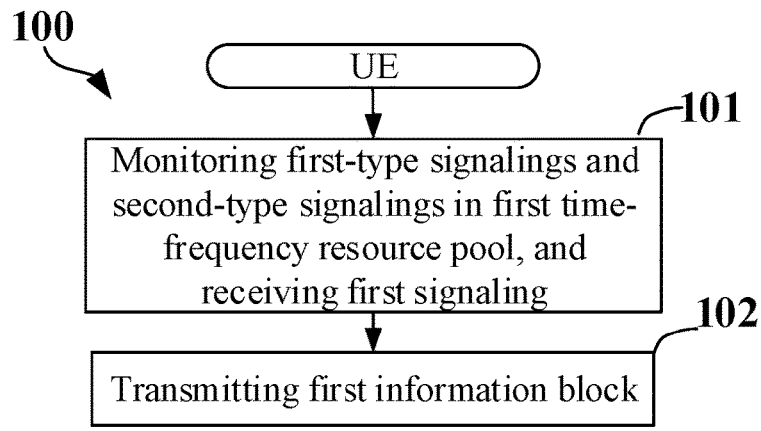
FIG. 1 illustrates a flowchart of a first signaling and a first information block according to one embodiment of the present disclosure.

Embodiment 1 illustrates a flowchart of a first signaling and a first information block according to one embodiment of the present disclosure, as shown in FIG. 1. In FIG. 1, each box represents a step. It is particularly underlined that the order in which the boxes are arranged does not imply a chronological sequence of each step respectively marked.

In Embodiment 1, the first node in the present disclosure monitors first-type signalings and second-type signalings in a first time-frequency resource pool, and receives a first signaling in step 101; and transmits a first information block in step 102; herein, the first information block comprises a HARQ-ACK associated with the first signaling; each of the first-type signalings and the second-type signalings comprises a first field; and each of the first-type signalings and the second-type signalings comprises a second field, the second field comprised by each of the first-type signalings indicates a first priority, and the second field comprised by each of the second-type signalings indicates a second priority, the first priority being different from the second priority; when the first signaling is one of the first-type signalings, a value of the first field comprised in the first signaling is related to both a number of the first-type signalings and a number of the second-type signalings transmitted in the first time-frequency resource pool; when the first signaling is one of the second-type signalings, a value of the first field comprised in the first signaling is related to the number of the second-type signalings transmitted in the first time-frequency resource pool, and unrelated to the number of the first-type signalings transmitted in the first time-frequency resource pool.

In one embodiment, the first time-frequency resource pool comprises a positive integer number of Resource Element(s) (RE).

In one embodiment, an RE occupies a multicarrier symbol in time domain and a subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the first time-frequency resource pool comprises a positive integer number of subcarrier(s) in frequency domain.

In one embodiment, the first time-frequency resource pool comprises a positive integer number of Physical Resource Block(s) (PRB) in frequency domain.

In one embodiment, the first time-frequency resource pool comprises a positive integer number of Resource block(s) (RB) in frequency domain.

In one embodiment, the first time-frequency resource pool comprises a positive integer number of multicarrier symbol(s) in time domain.

In one embodiment, the first time-frequency resource pool comprises a positive integer number of slot(s) in time domain.

In one embodiment, the first time-frequency resource pool comprises a positive integer number of non-consecutive slots in time domain.

In one embodiment, the first time-frequency resource pool comprises a positive integer number of consecutive slots in time domain.

In one embodiment, the first time-frequency resource pool comprises a positive integer number of sub-frame(s) in time domain.

In one embodiment, the first time-frequency resource pool is configured by a higher layer signaling.

In one embodiment, the first time-frequency resource pool is configured by a Radio Resource Control (RRC) signaling.

In one embodiment, the first time-frequency resource pool is configured by a Medium Access Control layer Control Element (MAC CE) signaling.

In one embodiment, the first time-frequency resource pool is pre-configured.

In one embodiment, a number of multicarrier symbols comprised by the first time-frequency resource pool in time domain is configured by a higher layer signaling.

In one embodiment, a number of multicarrier symbols comprised by the first time-frequency resource pool in time domain is configured by an RRC signaling.

In one embodiment, a number of multicarrier symbols comprised by the first time-frequency resource pool in time domain is configured by a MAC CE signaling.

In one embodiment, the monitoring refers to energy-detection-based receiving, namely, sensing energy of a radio signal and then averaging to acquire a received energy. If the received energy is greater than a second given threshold, it is determined that a signaling is received; otherwise it is determined that no signaling is received.

In one embodiment, the monitoring refers to coherent receiving, namely, performing coherent receiving and measuring energy of a signal obtained by the coherent receiving. If the energy of the signal obtained by the coherent receiving is greater than a first given threshold, it is determined that a signaling is received; otherwise it is determined that no signaling is received.

In one embodiment, the monitoring refers to Blind Decoding, namely, receiving a signal and performing decoding. If the decoding is determined as correct according to a Cyclic Redundancy Check (CRC) bit, it is determined that a signaling is received; otherwise it is determined that no signaling is received.

In one embodiment, the phrase of monitoring first-type signalings and second-type signalings in a first time-frequency resource pool includes that the first node determines according to CRC whether the first-type signalings are transmitted in the first time-frequency resource pool, and also determines according to CRC whether the second-type signalings are transmitted in the first time-frequency resource pool.

In one embodiment, the phrase of monitoring first-type signalings and second-type signalings in a first time-frequency resource pool includes that the first node performs Blind Decoding in the first time-frequency resource pool to determine whether the first-type signalings are transmitted, and performs Blind Detecting in the first time-frequency resource pool to determine whether the second-type signalings are transmitted.

In one embodiment, the first signaling is one of the first-type signalings, or, the first signaling is one of the second-type signalings.

In one embodiment, the first-type signalings are dynamically configured.

In one embodiment, the first-type signalings are physical layer signalings.

In one embodiment, the first-type signalings are Downlink Control Information (DCI) signalings.

In one embodiment, the first-type signalings are transmitted on a downlink physical layer control channel (i.e., a downlink channel only capable of carrying physical layer signalings).

In one embodiment, the first-type signalings are DCI format 1_0, and the detailed definition of the DCI format 1_0 can be found in 3GPP TS38.212, section 7.3.1.2.

In one embodiment, the first-type signalings are DCI format 1_1, and the detailed definition of the DCI format 1_1 can be found in 3GPP TS38.212, section 7.3.1.2.

In one embodiment, the first-type signalings are DCI format 1_2, and the detailed definition of the DCI format 1_2 can be found in 3GPP TS38.212, section 7.3.1.2.

In one embodiment, the first-type signalings comprise a signaling used for indicating Semi-Persistent Scheduling (SPS) Release.

In one embodiment, the first-type signalings comprise a signaling used for indicating configuration information of a downlink physical layer data channel.

In one embodiment, the first-type signalings comprise a signaling used for indicating configuration information of a Physical Downlink Shared Channel (PDSCH).

In one embodiment, the first-type signalings comprise a signaling used for scheduling of a downlink physical layer data channel.

In one embodiment, the first-type signalings comprise a signaling used for scheduling of a PDSCH.

In one embodiment, the downlink physical layer control channel is a Physical Downlink Control CHannel (PDCCH).

In one embodiment, the downlink physical layer control channel is a short PDCCH (sPDCCH).

In one embodiment, the downlink physical layer control channel is a Narrow Band PDCCH (NB-PDCCH).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a Narrow Band PDSCH (NB-PDSCH).

In one embodiment, the second-type signalings are dynamically configured.

In one embodiment, the second-type signalings are physical layer signalings.

In one embodiment, the second-type signalings are DCI signalings.

In one embodiment, the second-type signalings are transmitted on a downlink physical layer control channel (i.e., a downlink channel only capable of carrying physical layer signalings).

In one embodiment, the second-type signalings are DCI format 1_0, and the detailed definition of the DCI format 1_0 can be found in 3GPP TS38.212, section 7.3.1.2.

In one embodiment, the second-type signalings are DCI format 1_1, and the detailed definition of the DCI format 1_1 can be found in 3GPP TS38.212, section 7.3.1.2.

In one embodiment, the second-type signalings are DCI format 1_2, and the detailed definition of the DCI format 1_2 can be found in 3GPP TS38.212, section 7.3.1.2.

In one embodiment, the second-type signalings comprise a signaling used for indicating Semi-Persistent Scheduling (SPS) Release.

In one embodiment, the second-type signalings comprise a signaling used for indicating configuration information of a downlink physical layer data channel.

In one embodiment, the second-type signalings comprise a signaling used for indicating configuration information of a Physical Downlink Shared Channel (PDSCH).

In one embodiment, the second-type signalings comprise a signaling used for scheduling of a downlink physical layer data channel.

In one embodiment, the second-type signalings comprise a signaling used for scheduling of a PDSCH.

In one embodiment, formats of the second-type signalings are the same as those of the first-type signalings.

In one embodiment, formats of the second-type signalings are different from those of the first-type signalings.

In one embodiment, the second field comprises a positive integer number of bit(s).

In one embodiment, the second field comprises one bit.

In one embodiment, the second field is a Priority indicator Field, for the detailed definition of the Priority indicator Field, refer to 3GPP TS38.212, section 7.3.1.2.

In one embodiment, the first priority is higher than the second priority.

In one embodiment, a priority corresponding to the first priority is higher than a priority corresponding to the second priority.

In one embodiment, when a value of the second field is equal to 0, the second field indicates the first priority; when a value of the second field is equal to 1, the second field indicates the second priority.

In one embodiment, when a value of the second field is equal to 1, the second field indicates the first priority; when a value of the second field is equal to 0, the second field indicates the second priority.

In one embodiment, a higher layer signaling is used for indicating that each of the first-type signalings and the second-type signalings comprises the first field.

In one embodiment, an RRC layer signaling is used for indicating that each of the first-type signalings and the second-type signalings comprises the first field.

In one embodiment, the first field comprises a positive integer number of bit(s).

In one embodiment, the first field comprises a Downlink assignment index field, for the detailed definition of the Downlink assignment index field, refer to 3GPP TS38.212, section 7.3.1.2.

In one embodiment, a value of the first field indicates a total Downlink Assignment Index (DAI).

In one embodiment, values of the first fields comprised by the first-type signalings indicate a total DAI of the first-type signalings and the second-type signalings, and values of the first fields comprised by the second-type signalings indicate a total DAI of the second-type signalings.

In one embodiment, the number of the first-type signalings transmitted in the first time-frequency resource pool is a non-negative integer, and the number of the second-type signalings transmitted in the first time-frequency resource pool is a non-negative integer.

In one embodiment, the first signaling is one of the first-type signalings, and a value of the first field in the first signaling indicates a sum of a number of the first-type signalings and a number of the second-type signalings transmitted in the first time-frequency resource pool.

In one embodiment, the first signaling is one of the first-type signalings, and a sum of a number of the first-type signalings and a number of the second-type signalings transmitted in the first time-frequency resource pool is used for determining a value of the first field in the first signaling.

In one embodiment, the first signaling is one of the first-type signalings, and a value of the first field in the first signaling indicates a number of the first-type signalings and a number of the second-type signalings transmitted in the first time-frequency resource pool.

In one embodiment, the first signaling is one of the first-type signalings, and a number of the first-type signalings and a number of the second-type signalings transmitted in the first time-frequency resource pool are used for determining a value of the first field in the first signaling.

In one embodiment, the first signaling is one of the second-type signalings, and a value of the first field in the first signaling indicates a number of the second-type signalings transmitted in the first time-frequency resource pool.

In one embodiment, the first signaling is one of the second-type signalings, and a number of the second-type signalings transmitted in the first time-frequency resource pool is used for determining a value of the first field in the first signaling.

In one embodiment, the first signaling is one of the second-type signalings, and a value of the first field in the first signaling does not indicate a number of the second-type signalings transmitted in the first time-frequency resource pool.

In one embodiment, the first signaling is one of the second-type signalings, and a number of the second-type signalings transmitted in the first time-frequency resource pool is not used for determining a value of the first field in the first signaling.

In one embodiment, the first information block comprises Uplink Control Information (UCI).

In one embodiment, the first information block only comprises a Hybrid Automatic Repeat reQuest-Acknowledgement (HARQ-ACK).

In one embodiment, the first information block comprises a HARQ-ACK and Channel State Information (CSI).

In one embodiment, the first information block comprises HARQ-ACK and a Scheduling Request (SR).

In one embodiment, the first information block comprises a HARQ-ACK, CSI and an SR.

In one embodiment, the first information block is transmitted on a Physical Uplink Control CHannel (PUCCH).

In one embodiment, the HARQ-ACK associated with the first signaling comprises an ACK.

In one embodiment, the HARQ-ACK associated with the first signaling comprises a NACK.

In one embodiment, the HARQ-ACK associated with the first signaling comprises an ACK or a NACK.

In one embodiment, the HARQ-ACK associated with the first signaling indicates whether each bit block in a bit block set scheduled by the first signaling is correctly received.

In one embodiment, the first signaling comprises a signaling used for scheduling of a downlink physical layer data channel, and the HARQ-ACK associated with the first signaling indicates whether a transmission of a downlink physical layer data channel scheduled by the first signaling is correctly received.

In one embodiment, the first signaling comprises a signaling used for PDSCH scheduling, and the HARQ-ACK associated with the first signaling indicates whether a PDSCH transmission scheduled by the first signaling is correctly received.

In one embodiment, the HARQ-ACK associated with the first signaling indicates whether the first signaling is correctly received.

In one embodiment, the first signaling comprises a signaling used for indicating SPS Release, and the HARQ-ACK associated with the first signaling indicates whether the first signaling is correctly received.

Embodiment 2

Figure 2:
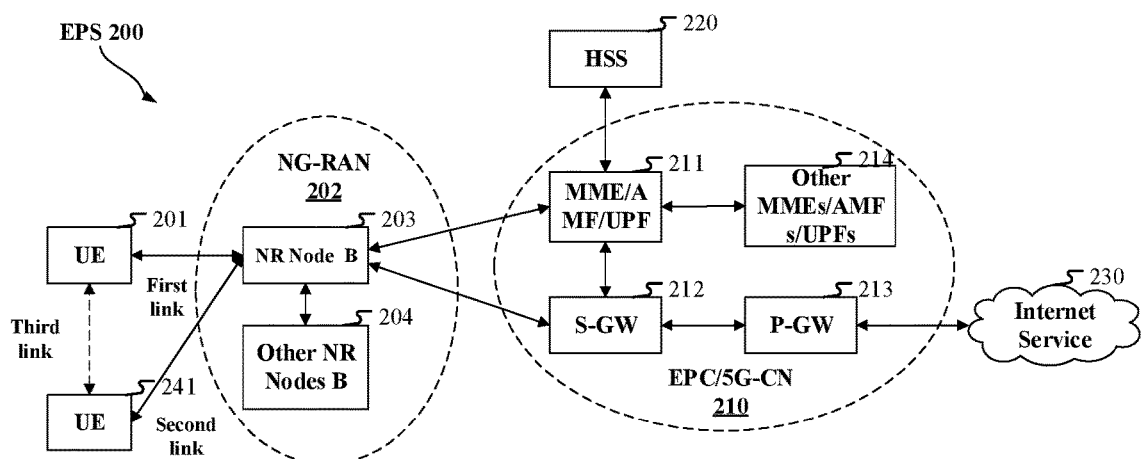
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200 or any other appropriate term. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 241 corresponds to the second node in the present disclosure.

In one embodiment, the gNB 203 corresponds to the second node in the present disclosure.

Embodiment 3

Figure 3:
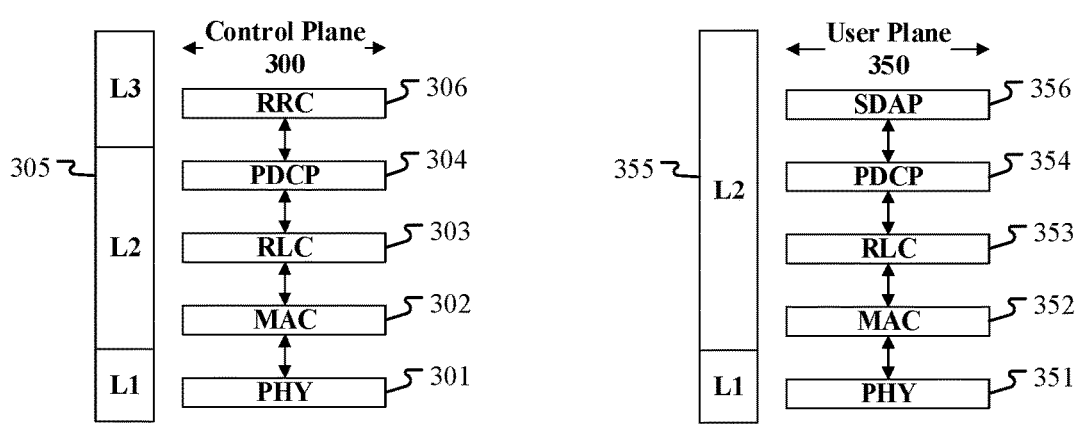
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first bit block set in the present disclosure is generated by the RRC sublayer 306.

In one embodiment, the first bit block set in the present disclosure is generated by the MAC sublayer 302.

In one embodiment, the first bit block set in the present disclosure is generated by the MAC sublayer 352.

In one embodiment, the first bit block set in the present disclosure is generated by the PHY 301.

In one embodiment, the first bit block set in the present disclosure is generated by the PHY 351.

In one embodiment, the first signaling in the present disclosure is generated by the PHY 301.

In one embodiment, the first signaling in the present disclosure is generated by the PHY 351.

In one embodiment, the second signaling in the present disclosure is generated by the PHY 301.

In one embodiment, the second signaling in the present disclosure is generated by the PHY 351.

In one embodiment, the first signaling set in the present disclosure is generated by the PHY 301.

In one embodiment, the first signaling set in the present disclosure is generated by the PHY 351.

In one embodiment, the monitoring in the present disclosure is generated by the PHY 301.

In one embodiment, the monitoring in the present disclosure is generated by the PHY 351.

In one embodiment, the first information block in the present disclosure is generated by the PHY 301.

In one embodiment, the first information block in the present disclosure is generated by the PHY 351.

Embodiment 4

Figure 4:
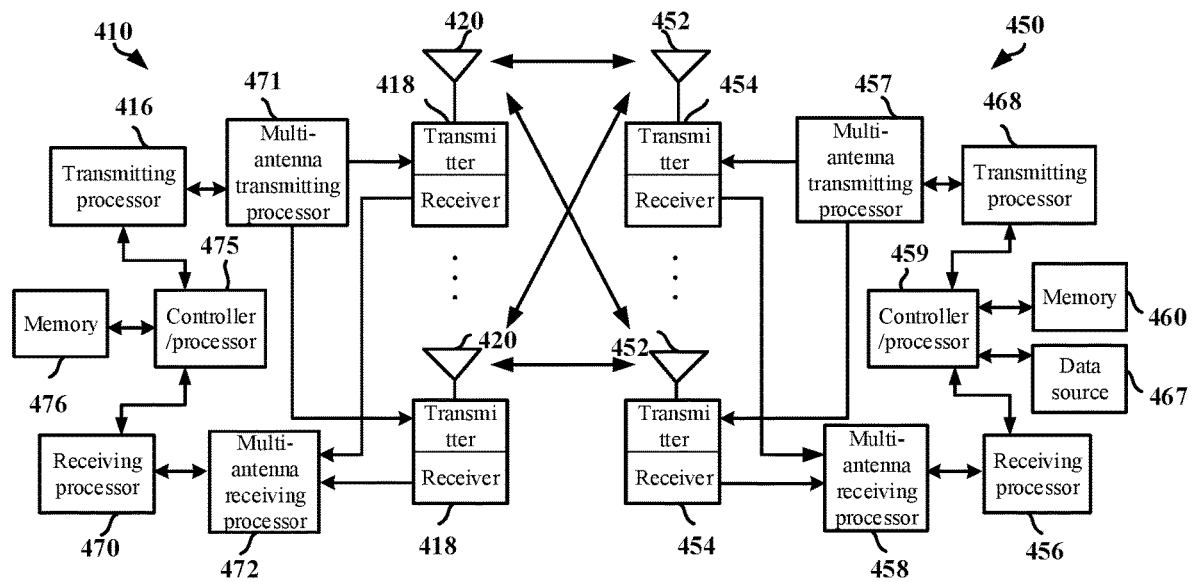
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG.

4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. The controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In a transmission between the first communication device 410 and the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment, the first node is a UE, and the second node is a UE.

In one subembodiment, the first node is a UE, and the second node is a relay node.

In one subembodiment, the first node is a relay node, and the second node is a UE.

In one subembodiment, the first node is a UE, and the second node is a base station.

In one subembodiment, the first node is a relay node, and the second node is a base station.

In one subembodiment, the second communication device 450 comprises at least one controller/processor; the at least one controller/processor is in charge of HARQ operation.

In one subembodiment, the first communication device 410 comprises at least one controller/processor; the at least one controller/processor is in charge of HARQ operation.

In one subembodiment, the first communication device 410 comprises at least one controller/processor; the at least one controller/processor is in charge of error detection using ACK and/or NACK protocols to support HARQ operation.

In one embodiment, the second communication device 450 comprises at least one processor and at least one memory, the at least one memory comprises computer program codes; the at least one memory and the computer program codes are configured to be used in collaboration with the at least one processor, the second communication device 450 at least monitors first-type signalings and second-type signalings in a first time-frequency resource pool, and receives a first signaling; and transmits a first information block; herein, the first information block comprises a HARQ-ACK associated with the first signaling; each of the first-type signalings and the second-type signalings comprises a first field; and each of the first-type signalings and the second-type signalings comprises a second field, the second field comprised by each of the first-type signalings indicates a first priority, and the second field comprised by each of the second-type signalings indicates a second priority, the first priority being different from the second priority; when the first signaling is one of the first-type signalings, a value of the first field comprised in the first signaling is related to both a number of the first-type signalings and a number of the second-type signalings transmitted in the first time-frequency resource pool; when the first signaling is one of the second-type signalings, a value of the first field comprised in the first signaling is related to the number of the second-type signalings transmitted in the first time-frequency resource pool, and unrelated to the number of the first-type signalings transmitted in the first time-frequency resource pool.

In one subembodiment, the second communication device 450 corresponds to the first node in the present disclosure.

In one embodiment, the second communication device 450 comprises a memory that stores computer readable instruction program, the computer readable instruction program generates actions when executed by at least one processor, which include: monitoring first-type signalings and second-type signalings in a first time-frequency resource pool, and receiving a first signaling; and transmitting a first information block; herein, the first information block comprises a HARQ-ACK associated with the first signaling; each of the first-type signalings and the second-type signalings comprises a first field; and each of the first-type signalings and the second-type signalings comprises a second field, the second field comprised by each of the first-type signalings indicates a first priority, and the second field comprised by each of the second-type signalings indicates a second priority, the first priority being different from the second priority; when the first signaling is one of the first-type signalings, a value of the first field comprised in the first signaling is related to both a number of the first-type signalings and a number of the second-type signalings transmitted in the first time-frequency resource pool; when the first signaling is one of the second-type signalings, a value of the first field comprised in the first signaling is related to the number of the second-type signalings transmitted in the first time-frequency resource pool, and unrelated to the number of the first-type signalings transmitted in the first time-frequency resource pool.

In one subembodiment, the second communication device 450 corresponds to the first node in the present disclosure.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits a first signaling in a first time-frequency resource pool; and receives a first information block; herein, the first information block comprises a HARQ-ACK associated with the first signaling; the first time-frequency resource pool is reserved for first-type signalings and second-type signalings; each of the first-type signalings and the second-type signalings comprises a first field; and each of the first-type signalings and the second-type signalings comprises a second field, the second field comprised by each of the first-type signalings indicates a first priority, and the second field comprised by each of the second-type signalings indicates a second priority, the first priority being different from the second priority; when the first signaling is one of the first-type signalings, a value of the first field comprised in the first signaling is related to both a number of the first-type signalings and a number of the second-type signalings transmitted in the first time-frequency resource pool; when the first signaling is one of the second-type signalings, a value of the first field comprised in the first signaling is related to the number of the second-type signalings transmitted in the first time-frequency resource pool, and unrelated to the number of the first-type signalings transmitted in the first time-frequency resource pool.

In one subembodiment, the first communication device 410 corresponds to the second node in the present disclosure.

In one embodiment, the first communication device 410 comprises a memory that stores computer readable instruction program, the computer readable instruction program generates actions when executed by at least one processor, which include: transmitting a first signaling in a first time-frequency resource pool; and receiving a first information block; herein, the first information block comprises a HARQ-ACK associated with the first signaling; the first time-frequency resource pool is reserved for first-type signalings and second-type signalings; each of the first-type signalings and the second-type signalings comprises a first field; and each of the first-type signalings and the second-type signalings comprises a second field, the second field comprised by each of the first-type signalings indicates a first priority, and the second field comprised by each of the second-type signalings indicates a second priority, the first priority being different from the second priority; when the first signaling is one of the first-type signalings, a value of the first field comprised in the first signaling is related to both a number of the first-type signalings and a number of the second-type signalings transmitted in the first time-frequency resource pool; when the first signaling is one of the second-type signalings, a value of the first field comprised in the first signaling is related to the number of the second-type signalings transmitted in the first time-frequency resource pool, and unrelated to the number of the first-type signalings transmitted in the first time-frequency resource pool.

In one subembodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460 or the data source 467 is used for monitoring first-type signalings and second-type signalings of the present disclosure in the first time-frequency resource pool of the present disclosure and receiving the first signaling of the present disclosure.

In one embodiment, at least one of the antenna 420, the transmitter 418, the multi-antenna transmitting processor 471, the transmitting processor 416, the controller/processor 475 or the memory 476 is used for transmitting the first signaling of the present disclosure in the first time-frequency resource pool of the present disclosure.

In one embodiment, at least one of the antenna 452, the receiver 454, the multi-antenna receiving processor 458, the receiving processor 456, the controller/processor 459, the memory 460 or the data source 467 is used for receiving the first bit block set of the present disclosure.

In one embodiment, at least one of the antenna 420, the transmitter 418, the multi-antenna transmitting processor 471, the transmitting processor 416, the controller/processor 475 or the memory 476 is used for transmitting the first bit block set of the present disclosure.

In one embodiment, at least one of the antenna 452, the receiver 454, the multi-antenna receiving processor 458, the receiving processor 456, the controller/processor 459, the memory 460 or the data source 467 is used for receiving the second signaling of the present disclosure in the first time-frequency resource pool of the present disclosure.

In one embodiment, at least one of the antenna 420, the transmitter 418, the multi-antenna transmitting processor 471, the transmitting processor 416, the controller/processor 475 or the memory 476 is used for transmitting the second signaling of the present disclosure in the first time-frequency resource pool of the present disclosure.

In one embodiment, at least one of the antenna 452, the receiver 454, the multi-antenna receiving processor 458, the receiving processor 456, the controller/processor 459, the memory 460 or the data source 467 is used for receiving L1-1 first-type signaling(s) in the first signaling set other than the first signaling and L2-1 second-type signaling(s) in the second signaling set other than the second signaling of the present disclosure in the first time-frequency resource pool of the present disclosure.

In one embodiment, at least one of the antenna 420, the transmitter 418, the multi-antenna transmitting processor 471, the transmitting processor 416, the controller/processor 475 or the memory 476 is used for transmitting L1-1 first-type signaling(s) in the first signaling set other than the first signaling and L2-1 second-type signaling(s) in the second signaling set other than the second signaling of the present disclosure in the first time-frequency resource pool of the present disclosure.

In one embodiment, at least one of the antenna 452, the transmitter 454, the multi-antenna transmitting processor 458, the transmitting processor 468, the controller/processor 459, the memory 460 or the data source 467 is used for transmitting the first information block of the present disclosure.

In one embodiment, at least one of the antenna 420, the receiver 418, the multi-antenna receiving processor 472, the receiving processor 470, the controller/processor 475 or the memory 476 is used for receiving the first information block of the present disclosure.

Embodiment 5

Figure 5:
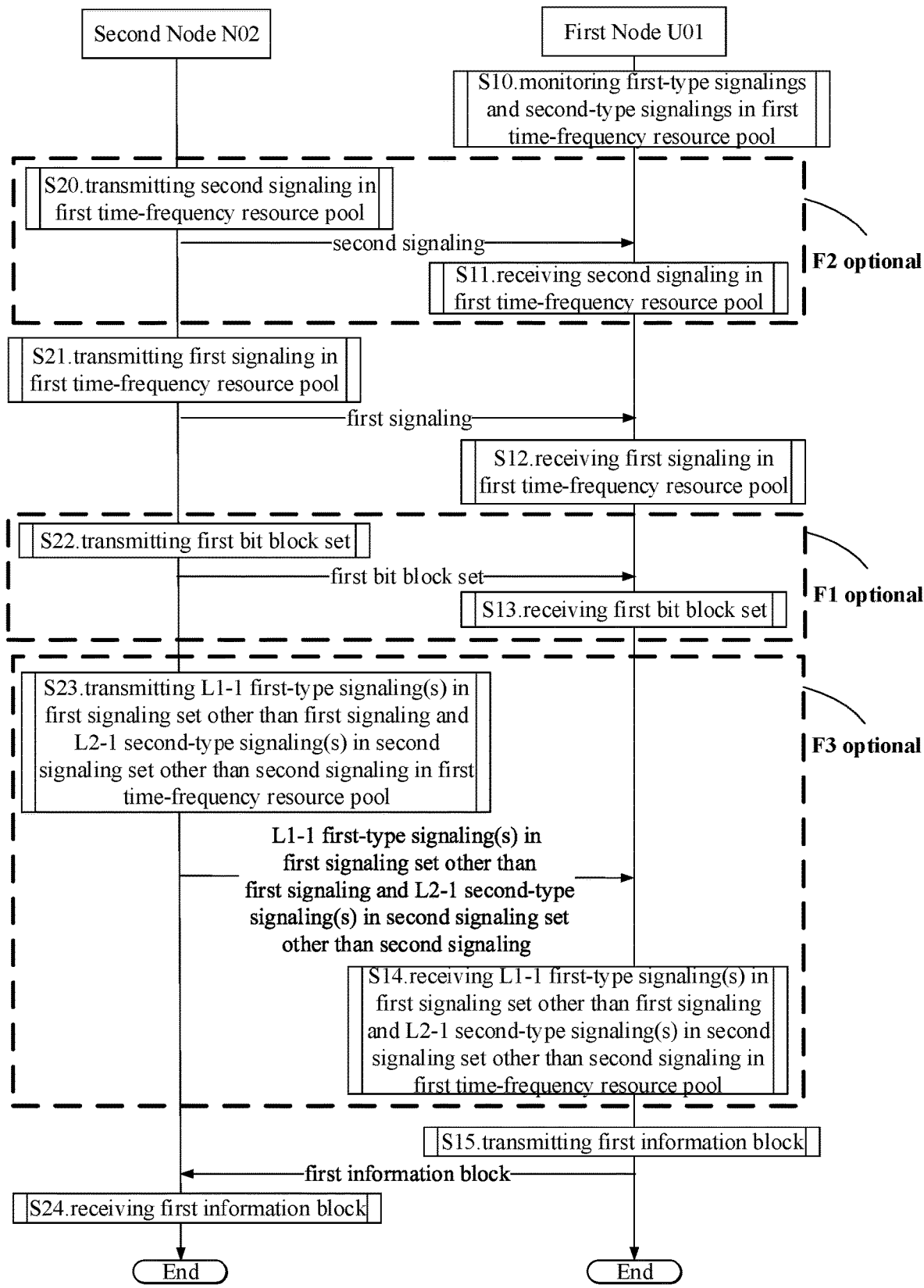
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a first node U01 and a second node N02 are in communication via an air interface. In FIG. 5, boxes F1, F2 and F3 framed with broken lines are optional.

The first node U01 monitors first-type signalings and second-type signalings in a first time-frequency resource pool in step S10; receives a second signaling in the first time-frequency resource pool in step S11; and receives a first signaling in the first time-frequency resource pool in step S12; receives a first bit block set in step S13; and receives L1-1 first-type signaling(s) in a first signaling set other than the first signaling and L2-1 second-type signaling(s) in a second signaling set other than the second signaling in the first time-frequency resource pool in step S14; and transmits a first information block in step S15.

The second node N02 transmits a second signaling in a first time-frequency resource pool in step S20; and transmits a first signaling in the first time-frequency resource pool in step S21; transmits a first bit block set in step S22; and transmits L1-1 first-type signaling(s) in a first signaling set other than the first signaling and L2-1 second-type signaling(s) in a second signaling set other than the second signaling in the first time-frequency resource pool in step S23; and receives a first information block in step S24.

In Embodiment 5, the first information block comprises a HARQ-ACK associated with the first signaling; each of the first-type signalings and the second-type signalings comprises a first field; and each of the first-type signalings and the second-type signalings comprises a second field, the second field comprised by each of the first-type signalings indicates a first priority, and the second field comprised by each of the second-type signalings indicates a second priority, the first priority being different from the second priority; when the first signaling is one of the first-type signalings, a value of the first field comprised in the first signaling is related to both a number of the first-type signalings and a number of the second-type signalings transmitted in the first time-frequency resource pool; when the first signaling is one of the second-type signalings, a value of the first field comprised in the first signaling is related to the number of the second-type signalings transmitted in the first time-frequency resource pool, and unrelated to the number of the first-type signalings transmitted in the first time-frequency resource pool. The first signaling is one of the first-type signalings, and the second signaling is one of the second-type signalings; a first sub-information-block comprises the HARQ-ACK associated with the first signaling, and the first sub-information-block belongs to the first information block, while a second sub-information-block comprises a HARQ-ACK associated with the second signaling; the first signaling indicates a first time-frequency resource block, while the second signaling indicates a second time-frequency resource block, the first time-frequency resource block being reserved for the first sub-information-block, and the second time-frequency resource block being reserved for the second sub-information-block; whether a time unit to which the first time-frequency resource block belongs in time domain is overlapped with a time unit to which the second time-frequency resource block belongs in time domain is used by the first node U01 for determining whether the first information block comprises the second sub-information-block, or, whether the first time-frequency resource block is overlapped with the second time-frequency resource block in time domain is used by the first node U01 for determining whether the first information block comprises the second sub-information-block. The first signaling set is composed of L1 first-type signalings detected in the first time-frequency resource pool, and the first signaling is a last first-type signaling in the first signaling set, L1 being a positive integer greater than 1; the first sub-information-block comprises L1 information sub-blocks, and the L1 first-type signalings respectively correspond to the L1 information sub-blocks, the L1 information sub-blocks respectively comprising HARQ-ACKs associated with corresponding first-type signalings; the second signaling set is composed of L2 second-type signalings detected in the first time-frequency resource pool, and the second signaling is a last second-type signaling in the second signaling set, L2 being a positive integer greater than 1; the second sub-information-block comprises L2 information sub-blocks, and the L2 second-type signalings respectively correspond to the L2 information sub-blocks, the L2 information sub-blocks respectively comprising HARQ-ACKs associated with corresponding second-type signalings. The first signaling comprises scheduling information of the first bit block set; the HARQ-ACK associated with the first signaling indicates whether each bit block in the first bit block set is correctly received.

In one embodiment, the broken-line box F1 exists.

In one embodiment, the broken-line box F1 does not exist, the first signaling is used for indicating Semi-Persistent Scheduling Release, and the HARQ-ACK associated with the first signaling indicates whether the first signaling is correctly received.

In one embodiment, the broken-line box F2 exists, and so does the broken-line box F3.

In one embodiment, the broken-line box F2 exists, while the broken-line box F3 does not exist.

In one embodiment, the broken-line box F2 does not exist, and neither does the broken-line box F3.

In one embodiment, the second field comprised in the first signaling indicates the first priority, while the second field comprised in the second signaling indicates the second priority.

In one embodiment, the method in the first node also comprises:

receiving a second bit block set;

herein, the second signaling comprises scheduling information of the second bit block set; the HARQ-ACK associated with the second signaling indicates whether each bit block in the second bit block set is correctly received.

In one embodiment, the method in the second node also comprises:

transmitting a second bit block set;

herein, the second signaling comprises scheduling information of the second bit block set; the HARQ-ACK associated with the second signaling indicates whether each bit block in the second bit block set is correctly received.

In one embodiment, the first receiver also receives a second bit block set; herein, the second signaling comprises scheduling information of the second bit block set; the HARQ-ACK associated with the second signaling indicates whether each bit block in the second bit block set is correctly received.

In one embodiment, the second transmitter also transmits a second bit block set; herein, the second signaling comprises scheduling information of the second bit block set; the HARQ-ACK associated with the second signaling indicates whether each bit block in the second bit block set is correctly received.

In one embodiment, the second signaling is used for indicating SPS Release, and the HARQ-ACK associated with the second signaling indicates whether the second signaling is correctly received.

In one embodiment, the second bit block set comprises a positive integer number of Transport Block(s) (TB).

In one embodiment, the second bit block set comprises a TB.

In one embodiment, the second bit block set comprises a positive integer number of CBG(s).

In one embodiment, the second bit block set comprises a positive integer number of bit(s).

In one embodiment, the scheduling information of the second bit block set comprises at least one of time-domain resources occupied, frequency-domain resources occupied, a Modulation and Coding Scheme (MCS), configuration information of DeModulation Reference Signals (DMRS), a Hybrid Automatic Repeat reQuest (HARQ) process ID, a Redundancy Version (RV), a New Data Indicator (NDI), a transmission antenna port or a corresponding Transmission Configuration Indicator (TCI) state.

In one subembodiment, the configuration information of the DMRS comprises at least one of a Reference Signal (RS) sequence, a mapping mode, a DMRS type, time-domain resources occupied, frequency-domain resources occupied, code-domain resources occupied, a cyclic shift or an Orthogonal Cover Code (OCC).

In one embodiment, the first information block comprises the first sub-information-block and the second sub-information-block.

In one embodiment, the first information block comprises only the first sub-information-block of the first sub-information-block and the second sub-information-block.

In one embodiment, the first sub-information-block comprises Uplink Control Information (UCI).

In one embodiment, the first sub-information-block only comprises a Hybrid Automatic Repeat reQuest-Acknowledgement (HARQ-ACK).

In one embodiment, the first sub-information-block comprises a HARQ-ACK and CSI.

In one embodiment, the first sub-information-block comprises a HARQ-ACK and an SR.

In one embodiment, the first sub-information-block comprises a HARQ-ACK, CSI and an SR.

In one embodiment, the second sub-information-block comprises Uplink Control Information (UCI).

In one embodiment, the second sub-information-block only comprises a Hybrid Automatic Repeat reQuest-Acknowledgement (HARQ-ACK).

In one embodiment, the second sub-information-block comprises a HARQ-ACK and CSI.

In one embodiment, the second sub-information-block comprises a HARQ-ACK and an SR.

In one embodiment, the second sub-information-block comprises a HARQ-ACK, CSI and an SR.

In one embodiment, the HARQ-ACK associated with the second signaling comprises an ACK.

In one embodiment, the HARQ-ACK associated with the second signaling comprises a NACK.

In one embodiment, the HARQ-ACK associated with the second signaling comprises an ACK or a NACK.

In one embodiment, the HARQ-ACK associated with the second signaling indicates whether each bit block in a bit block set scheduled by the second signaling is correctly received.

In one embodiment, the second signaling comprises a signaling used for scheduling of a downlink physical layer data channel, and the HARQ-ACK associated with the second signaling indicates whether transmission of a downlink physical layer data channel scheduled by the second signaling is correctly received.

In one embodiment, the second signaling comprises a signaling used for PDSCH scheduling, and the HARQ-ACK associated with the second signaling indicates whether transmission of a PDSCH scheduled by the second signaling is correctly received.

In one embodiment, the HARQ-ACK associated with the second signaling indicates whether the second signaling is correctly received.

In one embodiment, the second signaling comprises a signaling used for indicating SPS Release, and the HARQ-ACK associated with the second signaling indicates whether the second signaling is correctly received.

In one embodiment, the first time-frequency resource block comprises a positive integer number of RE(s), and the second time-frequency resource block comprises a positive integer number of RE(s).

In one embodiment, the first time-frequency resource block comprises a positive integer number of subcarrier(s) in frequency domain, and the second time-frequency resource block comprises a positive integer number of subcarrier(s) in frequency domain.

In one embodiment, the first time-frequency resource block comprises a positive integer number of PRB(s) in frequency domain, and the second time-frequency resource block comprises a positive integer number of PRB(s) in frequency domain.

In one embodiment, the first time-frequency resource block comprises a positive integer number of RB(s) in frequency domain, and the second time-frequency resource block comprises a positive integer number of RB(s) in frequency domain.

In one embodiment, the first time-frequency resource block comprises a positive integer number of multicarrier symbol(s) in time domain, and the second time-frequency resource block comprises a positive integer number of multicarrier symbol(s) in time domain.

In one embodiment, the first time-frequency resource block belongs to a slot in time domain, and the second time-frequency resource block belongs to a slot in time domain.

In one embodiment, the first time-frequency resource block belongs to a sub-frame in time domain, and the second time-frequency resource block belongs to a sub-frame in time domain.

In one embodiment, the first time-frequency resource block and the second time-frequency resource block are configured by a higher layer signaling.

In one embodiment, the first time-frequency resource block and the second time-frequency resource block are configured by an RRC signaling.

In one embodiment, the first time-frequency resource block and the second time-frequency resource block are configured by a MAC CE signaling.

In one embodiment, the first time-frequency resource block and the second time-frequency resource block are pre-configured.

In one embodiment, both the first signaling and the second signaling comprise a fourth field, the fourth field comprised by the first signaling indicates a first time-frequency resource block, while the fourth field comprised by the second signaling indicates a second time-frequency resource block.

In one subembodiment, the fourth field is a PUCCH resource indicator field, and the detailed definition of the PUCCH resource indicator field can be found in 3GPP TS38.212, section 7.3.1.2.

In one subembodiment, the fourth field comprises a positive integer number of bit(s).

In one subembodiment, the fourth field comprises 3 bits.

In one embodiment, the second time-frequency resource block is a time-frequency resource block in a second time-frequency resource block set, and the second time-frequency resource block set is one of N time-frequency resource block sets, any of the N time-frequency resource block sets comprising a positive integer number of time-frequency resource block(s), N being a positive integer greater than 1; a number of bits comprised in the second sub-information-block is used for determining the second time-frequency resource block set out of the N time-frequency resource block sets.

In one subembodiment, the second signaling is used for indicating the second time-frequency resource block from the second time-frequency resource block set.

In one subembodiment, the second signaling indicates an index of the second time-frequency resource block in the second time-frequency resource block set.

In one subembodiment, the second signaling comprises a fourth field, and the fourth field comprised in the second signaling indicates an index of the second time-frequency resource block in the second time-frequency resource block set.

In one embodiment, the first time-frequency resource block and the second time-frequency resource block both comprise a PUCCH resource.

In one embodiment, the first time-frequency resource block and the second time-frequency resource block are both reserved for a PUCCH.

In one embodiment, the first time-frequency resource block is reserved for transmission of the first sub-information-block, while the second time-frequency resource block is reserved for transmission of the second sub-information-block.

In one embodiment, the first signaling is one of the first-type signalings, and the second signaling is one of the second-type signalings; a first sub-information-block comprises the HARQ-ACK associated with the first signaling, and the first sub-information-block belongs to the first information block, while a second sub-information-block comprises a HARQ-ACK associated with the second signaling; the first signaling indicates a first time-frequency resource block, while the second signaling indicates a second time-frequency resource block, the first time-frequency resource block being reserved for the first sub-information-block, and the second time-frequency resource block being reserved for the second sub-information-block; a time unit to which the first time-frequency resource block belongs in time domain is overlapped with a time unit to which the second time-frequency resource block belongs in time domain, and the first information block comprises the second sub-information-block and the first sub-information-block.

In one embodiment, the first signaling is one of the first-type signalings, and the second signaling is one of the second-type signalings; a first sub-information-block comprises the HARQ-ACK associated with the first signaling, and the first sub-information-block belongs to the first information block, while a second sub-information-block comprises a HARQ-ACK associated with the second signaling; the first signaling indicates a first time-frequency resource block, while the second signaling indicates a second time-frequency resource block, the first time-frequency resource block being reserved for the first sub-information-block, and the second time-frequency resource block being reserved for the second sub-information-block; the first time-frequency resource block is overlapped with the second time-frequency resource block in time domain, and the first information block comprises the second sub-information-block and the first sub-information-block.

In one embodiment, the method in the first node also comprises:
transmitting the second sub-information-block in the second time-frequency resource block.

In one subembodiment, the method in the second node also comprises:
receiving the second sub-information-block in the second time-frequency resource block.

In one embodiment, the first transmitter also transmits the second sub-information-block in the second time-frequency resource block, and the second receives also receives the second sub-information-block in the second time-frequency resource block.

In one embodiment, the method in the first node also comprises:
dropping transmitting the second sub-information-block in the second time-frequency resource block.

In one embodiment, the first transmitter drops transmitting the second sub-information-block in the second time-frequency resource block.

In one embodiment, the method in the first node also comprises:
transmitting the second sub-information-block in the second time-frequency resource block, or dropping transmitting the second sub-information-block in the second time-frequency resource block.

In one embodiment, the first transmitter also transmits the second sub-information-block in the second time-frequency resource block, or, the first transmitter drops transmitting the second sub-information-block in the second time-frequency resource block.

In one embodiment, whether the first information block comprises the second sub-information-block is used for determining whether the first node transmits the second sub-information-block in the second time-frequency resource block.

In one embodiment, the first information block comprises only the first sub-information-block of the first sub-information-block and the second sub-information-block, and the first node transmits the second sub-information-block in the second time-frequency resource block.

In one embodiment, a time unit to which the first time-frequency resource block belongs in time domain is orthogonal (that is, non-overlapping) with a time unit to which the second time-frequency resource block belongs in time domain, and the first node transmits the second sub-information-block in the second time-frequency resource block.

In one embodiment, the first time-frequency resource block is orthogonal (that is, non-overlapping) with the second time-frequency resource block in time domain, and the first node transmits the second sub-information-block in the second time-frequency resource block.

In one embodiment, the first information block comprises the first sub-information-block and the second sub-information-block, and the first node drops transmitting the second sub-information-block in the second time-frequency resource block.

In one embodiment, a time unit to which the first time-frequency resource block belongs in time domain is overlapped with a time unit to which the second time-frequency resource block belongs in time domain, and the first node drops transmitting the second sub-information-block in the second time-frequency resource block.

In one embodiment, the first time-frequency resource block is overlapping with the second time-frequency resource block in time domain, and the first node drops transmitting the second sub-information-block in the second time-frequency resource block.

Embodiment 6

Figure 6:
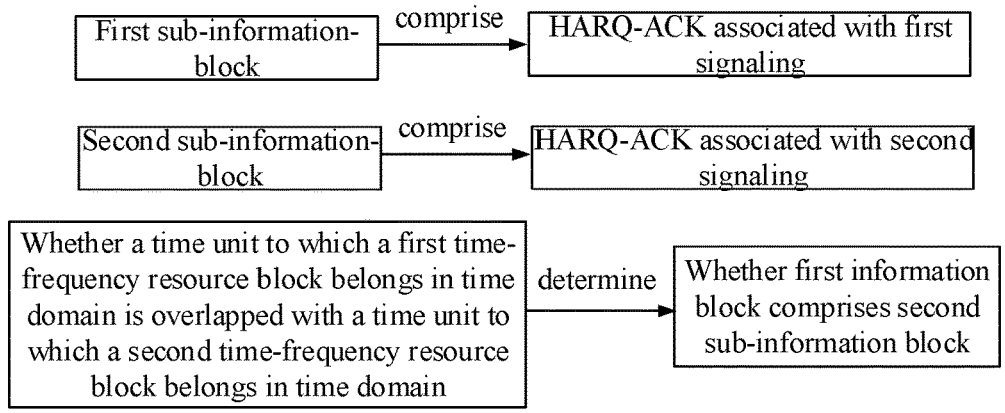
FIG. 6 illustrates a schematic diagram of whether a first information block comprises a second sub-information-block according to one embodiment of the present disclosure.

Embodiment 6 illustrates a schematic diagram of whether a first information block comprises a second sub-information-block, as shown in FIG. 6.

In Embodiment 6, the first signaling in the present disclosure is one of the first-type signalings in the present disclosure, and the second signaling in the present disclosure is one of the second-type signalings in the present disclosure; the first sub-information-block in the present disclosure comprises the HARQ-ACK associated with the first signaling in the present disclosure, and the first sub-information-block belongs to the first information block, while a second sub-information-block comprises a HARQ-ACK associated with the second signaling; the first signaling indicates a first time-frequency resource block, while the second signaling indicates a second time-frequency resource block, the first time-frequency resource block being reserved for the first sub-information-block, and the second time-frequency resource block being reserved for the second sub-information-block; whether a time unit to which the first time-frequency resource block belongs in time domain is overlapped with a time unit to which the second time-frequency resource block belongs in time domain is used for determining whether the first information block comprises the second sub-information-block.

In one embodiment, the time unit to which the first time-frequency resource block belongs in time domain comprises a slot, and the time unit to which the second time-frequency resource block belongs in time domain comprises a slot.

In one embodiment, the time unit to which the first time-frequency resource block belongs in time domain comprises a sub-frame, and the time unit to which the second time-frequency resource block belongs in time domain comprises a sub-frame.

In one embodiment, the time unit to which the first time-frequency resource block belongs in time domain and the time unit to which the second time-frequency resource block belongs in time domain comprise equal numbers of slots.

In one embodiment, the time unit to which the first time-frequency resource block belongs in time domain and the time unit to which the second time-frequency resource block belongs in time domain comprise equal numbers of sub-frames.

In one embodiment, the time unit to which the first time-frequency resource block belongs in time domain and the time unit to which the second time-frequency resource block belongs in time domain comprise equal numbers of multicarrier symbols.

In one embodiment, a time unit to which the first time-frequency resource block belongs in time domain is overlapped with a time unit to which the second time-frequency resource block belongs in time domain, and the first information block comprises the first sub-information-block and the second sub-information-block.

In one embodiment, a time unit to which the first time-frequency resource block belongs in time domain is orthogonal (that is, non-overlapping) with a time unit to which the second time-frequency resource block belongs in time domain, and the first information block comprises only the first sub-information-block of the first sub-information-block and the second sub-information-block.

In one embodiment, the phrase that "a time unit to which the first time-frequency resource block belongs in time domain is overlapped with a time unit to which the second time-frequency resource block belongs in time domain" means that: the time unit to which the first time-frequency resource block belongs in time domain is the same as the time unit to which the second time-frequency resource block belongs in time domain; the phrase that "a time unit to which the first time-frequency resource block belongs in time domain is orthogonal (that is, non-overlapping) with a time unit to which the second time-frequency resource block belongs in time domain" means that: the time unit to which the first time-frequency resource block belongs in time domain is different from the time unit to which the second time-frequency resource block belongs in time domain.

In one embodiment, the phrase that "a time unit to which the first time-frequency resource block belongs in time domain is overlapped with a time unit to which the second time-frequency resource block belongs in time domain" means that: the time unit to which the first time-frequency resource block belongs in time domain and the time unit to which the second time-frequency resource block belongs in time domain comprise (a) same multicarrier symbol(s); the phrase that "a time unit to which the first time-frequency resource block belongs in time domain is orthogonal (that is, non-overlapping) with a time unit to which the second time-frequency resource block belongs in time domain" means that: any multicarrier symbol comprised in the time unit to which the first time-frequency resource block belongs in time domain does not belong to the time unit to which the second time-frequency resource block belongs in time domain.

Embodiment 7

Figure 7:
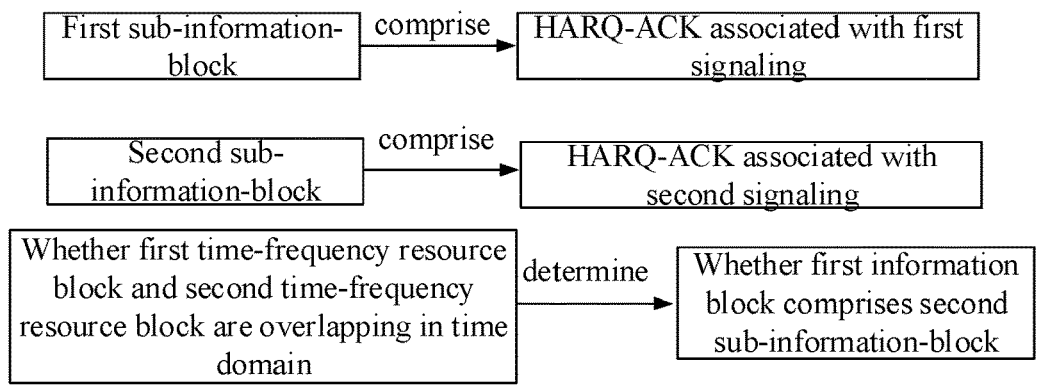
FIG. 7 illustrates a schematic diagram of whether a first information block comprises a second sub-information-block according to another embodiment of the present disclosure.

Embodiment 7 illustrates another schematic diagram of whether a first information block comprises a second sub-information-block, as shown in FIG. 7.

In Embodiment 7, the first signaling in the present disclosure is one of the first-type signalings in the present disclosure, and the second signaling in the present disclosure is one of the second-type signalings in the present disclosure; the first sub-information-block in the present disclosure comprises the HARQ-ACK associated with the first signaling in the present disclosure, and the first sub-information-block belongs to the first information block, while a second sub-information-block comprises a HARQ-ACK associated with the second signaling; the first signaling indicates a first time-frequency resource block, while the second signaling indicates a second time-frequency resource block, the first time-frequency resource block being reserved for the first sub-information-block, and the second time-frequency resource block being reserved for the second sub-information-block; whether the first time-frequency resource block is overlapped with the second time-frequency resource block in time domain is used for determining whether the first information block comprises the second sub-information-block.

In one embodiment, the first time-frequency resource block is overlapping with the second time-frequency resource block in time domain, and the first information block comprises the first sub-information-block and the second sub-information-block.

In one embodiment, the first time-frequency resource block is orthogonal (that is, non-overlapping) with the second time-frequency resource block in time domain, and the first information block comprises only the first sub-information-block of the first sub-information-block and the second sub-information-block.

In one embodiment, the first time-frequency resource block is overlapping with the second time-frequency resource block in time domain, the first time-frequency resource block and the second time-frequency resource block comprising a same multicarrier symbol.

In one embodiment, the first time-frequency resource block is orthogonal (that is, non-overlapping) with the second time-frequency resource block in time domain, any multicarrier symbol in the first time-frequency resource block not belonging to the second time-frequency resource block.

Embodiment 8

Figure 8:
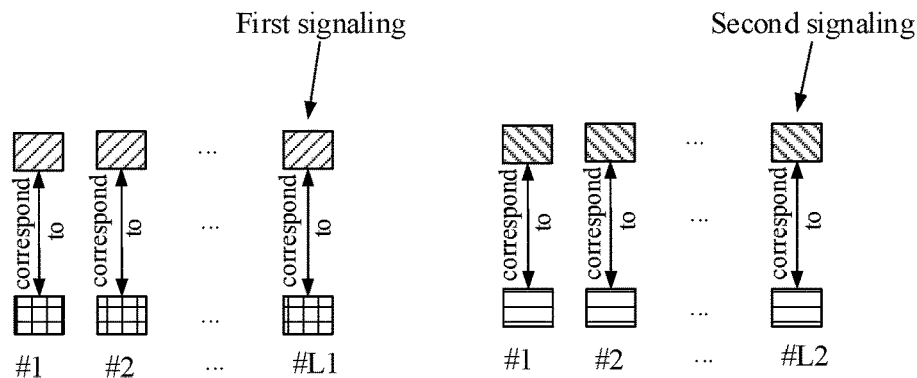
FIG. 8 illustrates a schematic diagram of relations among a first signaling set, a second signaling set, a first sub-information-block and a second sub-information-block according to one embodiment of the present disclosure.

Embodiment 8 illustrates a schematic diagram of relations among a first signaling set, a second signaling set, a first sub-information-block and a second sub-information-block, as shown in FIG. 8.

In Embodiment 8, the first signaling set is composed of L1 first-type signalings detected in the first time-frequency resource pool of the present disclosure, and the first signaling is a last first-type signaling in the first signaling set, L1 being a positive integer greater than 1; the first sub-information-block comprises L1 information sub-blocks, and the L1 first-type signalings respectively correspond to the L1 information sub-blocks, the L1 information sub-blocks respectively comprising HARQ-ACKs associated with corresponding first-type signalings; the second signaling set is composed of L2 second-type signalings detected in the first time-frequency resource pool, and the second signaling is a last second-type signaling in the second signaling set, L2 being a positive integer greater than 1; the second sub-information-block comprises L2 information sub-blocks, and the L2 second-type signalings respectively correspond to the L2 information sub-blocks, the L2 information sub-blocks respectively comprising HARQ-ACKs associated with corresponding second-type signalings.

In one embodiment, a value of the first field comprised in the first signaling indicates a sum of the L1 and the L2.

In one embodiment, a value of the first field comprised in the first signaling indicates a positive integer no less than a sum of the L1 and the L2.

In one embodiment, a value of the second field comprised in the second signaling indicates the L2.

In one embodiment, a value of the second field comprised in the second signaling indicates a positive integer no less than the L2.

In one embodiment, a given information sub-block is any of the L1 information sub-blocks, and a given signaling is one of the L1 first-type signalings corresponding to the given information sub-block, the given information sub-block comprising a HARQ-ACK associated with the given signaling.

In one subembodiment, the given information sub-block comprises UCI.

In one subembodiment, the given information sub-block comprises only a HARQ-ACK.

In one subembodiment, the given information sub-block comprises a HARQ-ACK and CSI.

In one subembodiment, the given information sub-block comprises a HARQ-ACK and an SR.

In one subembodiment, the given information sub-block comprises a HARQ-ACK, CSI and an SR.

In one subembodiment, the HARQ-ACK associated with the given signaling comprises an ACK.

In one subembodiment, the HARQ-ACK associated with the given signaling comprises a NACK.

In one subembodiment, the HARQ-ACK associated with the given signaling comprises an ACK or a NACK.

In one subembodiment, the HARQ-ACK associated with the given signaling indicates whether each bit block in a bit block set scheduled by the given signaling is correctly received.

In one subembodiment, the given signaling comprises a signaling used for scheduling of a downlink physical layer data channel, and the HARQ-ACK associated with the given signaling indicates whether transmission of the downlink physical layer data channel scheduled by the given signaling is correctly received.

In one subembodiment, the given signaling comprises a signaling used for PDSCH scheduling, and the HARQ-ACK associated with the given signaling indicates whether transmission of the PDSCH scheduled by the given signaling is correctly received.

In one subembodiment, the HARQ-ACK associated with the given signaling indicates whether the given signaling is correctly received.

In one subembodiment, the given signaling comprises a signaling used for indicating SPS Release, and the HARQ-ACK associated with the given signaling indicates whether the given signaling is correctly received.

In one subembodiment, the method in the first node also comprises:
receiving a given bit block set;
herein, the given signaling comprises scheduling information of the given bit block set; the HARQ-ACK associated with the given signaling indicates whether each bit block in the given bit block set is correctly received.

In one subembodiment, the method in the second node also comprises:
transmitting a given bit block set;
herein, the given signaling comprises scheduling information of the given bit block set; the HARQ-ACK associated with the given signaling indicates whether each bit block in the given bit block set is correctly received.

In one subembodiment, the first receiver also receives a given bit block set; herein, the given signaling comprises scheduling information of the given bit block set; the HARQ-ACK associated with the given signaling indicates whether each bit block in the given bit block set is correctly received.

In one subembodiment, the second transmitter also transmits a given bit block set; herein, the given signaling comprises scheduling information of the given bit block set; the HARQ-ACK associated with the given signaling indicates whether each bit block in the given bit block set is correctly received.

In one subembodiment, the given signaling is used for indicating SPS Release, and the HARQ-ACK associated with the given signaling indicates whether the given signaling is correctly received.

In one embodiment, the phrase that the first signaling is a last first-type signaling in the first signaling set means that when arranging L1 first-type signalings in the first signaling set according to a first rule, the first signaling is a first-type signaling placed last in the first signaling set; the phrase that the second signaling is a last second-type signaling in the second signaling set means that when arranging L2 second-type signalings in the second signaling set according to a first rule, the second signaling is a second-type signaling placed last in the second signaling set.

In one subembodiment, the first rule is related to frequency-domain resources occupied and time-domain resources occupied.

In one subembodiment, the first rule is related to a carrier to which it belongs and (a) Monitoring Occasion(s).

In one subembodiment, the first rule is related to serving cell(s) and (a) Monitoring Occasion(s).

In one subembodiment, the first rule comprises: arranging first in an ascending order of serving cell index in a same Monitoring Occasion, and then in an ascending order of Monitoring Occasion index.

In one embodiment, the phrase that the first signaling is a last first-type signaling in the first signaling set means that: when indexing L1 first-type signalings in the first signaling set according to a second rule, the first signaling is a first-type signaling with a maximum index in the first signaling set; the phrase that the second signaling is a last second-type signaling in the second signaling set means that: when indexing L2 second-type signalings in the second signaling set according to a second rule, the second signaling is a second-type signaling with a maximum index in the second signaling set.

In one subembodiment, the second rule is related to frequency-domain resources occupied and time-domain resources occupied.

In one subembodiment, the second rule is related to a carrier to which it belongs and (a) Monitoring Occasion(s).

In one subembodiment, the second rule is related to serving cell(s) and (a) Monitoring Occasion(s).

In one subembodiment, the second rule comprises: indexing first in an ascending order of serving cell index in a same Monitoring Occasion, and then in an ascending order of Monitoring Occasions index.

Embodiment 9

Figure 9:
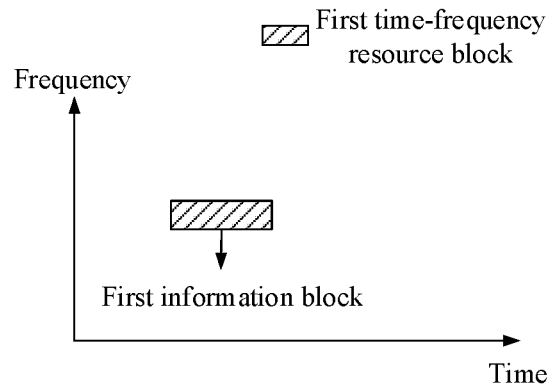
FIG. 9 illustrates a schematic diagram of time-frequency resources occupied by a first information block according to one embodiment of the present disclosure.

Embodiment 9 illustrates a schematic diagram of time-frequency resources occupied by a first information block, as shown in FIG. 9.

In Embodiment 9, the first information block is transmitted in the first time-frequency resource block.

In one embodiment, the first time-frequency resource block is a time-frequency resource block in a first time-frequency resource block set, and the first time-frequency resource block set is one of N time-frequency resource block sets, any of the N time-frequency resource block sets comprising a positive integer number of time-frequency resource block(s), N being a positive integer greater than 1; a number of bits comprised in the first sub-information-block is used for determining the first time-frequency resource block set out of the N time-frequency resource block sets.

In one subembodiment, the first signaling is used for indicating the first time-frequency resource block from the first time-frequency resource block set.

In one subembodiment, the first signaling indicates an index of the first time-frequency resource block in the first time-frequency resource block set.

In one subembodiment, the first signaling comprises a fourth field, and the fourth field comprised in the first signaling indicates an index of the first time-frequency resource block in the first time-frequency resource block set.

In one embodiment, the first time-frequency resource block is a time-frequency resource block in a first time-frequency resource block set, and the first time-frequency resource block set is one of N time-frequency resource block sets, any of the N time-frequency resource block sets comprising a positive integer number of time-frequency resource block(s), N being a positive integer greater than 1; a number of bits comprised in the first information block is used for determining the first time-frequency resource block set out of the N time-frequency resource block sets.

In one subembodiment, the first information block comprises only the first sub-information-block of the first sub-information-block and the second sub-information-block, and a number of bits comprised in the first information block is equal to a number of bits comprised in the first sub-information-block.

In one subembodiment, the first information block comprises the first sub-information-block and the second sub-information-block, and a number of bits comprised in the first information block is equal to a sum of a number of bits comprised in the first sub-information-block and a number of bits comprised in the second sub-information-block.

In one subembodiment, the first signaling is used for indicating the first time-frequency resource block from the first time-frequency resource block set.

In one subembodiment, the first signaling indicates an index of the first time-frequency resource block in the first time-frequency resource block set.

In one subembodiment, the first signaling comprises a fourth field, and the fourth field comprised in the first signaling indicates an index of the first time-frequency resource block in the first time-frequency resource block set.

In one embodiment, the method in the first node also comprises:
receiving first information;
herein, the first information indicates N time-frequency resource block sets, any of the N time-frequency resource block sets comprising a positive integer number of time-frequency resource block(s), N being a positive integer greater than 1; the first time-frequency resource block is a time-frequency resource block in the N time-frequency resource block sets.

In one subembodiment, the second time-frequency resource block is a time-frequency resource block in the N time-frequency resource block sets.

In one embodiment, the method in the second node also comprises:
transmitting first information;
herein, the first information indicates N time-frequency resource block sets, any of the N time-frequency resource block sets comprising a positive integer number of time-frequency resource block(s), N being a positive integer greater than 1; the first time-frequency resource block is a time-frequency resource block in the N time-frequency resource block sets.

In one subembodiment, the second time-frequency resource block is a time-frequency resource block in the N time-frequency resource block sets.

In one embodiment, the first receiver also receives first information; herein, the first information indicates N time-frequency resource block sets, any of the N time-frequency resource block sets comprising a positive integer number of time-frequency resource block(s), N being a positive integer greater than 1; the first time-frequency resource block is a time-frequency resource block in the N time-frequency resource block sets.

In one subembodiment, the second time-frequency resource block is a time-frequency resource block in the N time-frequency resource block sets.

In one embodiment, the second transmitter also transmits first information; herein, the first information indicates N time-frequency resource block sets, any of the N time-frequency resource block sets comprising a positive integer number of time-frequency resource block(s), N being a positive integer greater than 1; the first time-frequency resource block is a time-frequency resource block in the N time-frequency resource block sets.

In one subembodiment, the second time-frequency resource block is a time-frequency resource block in the N time-frequency resource block sets.

Embodiment 10

Figure 10:
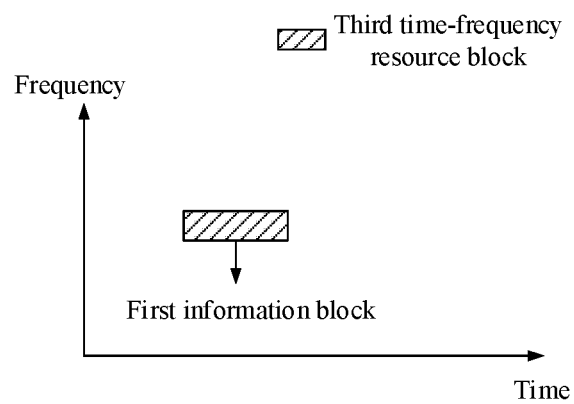
FIG. 10 illustrates a schematic diagram of time-frequency resources occupied by a first information block according to another embodiment of the present disclosure.

Embodiment 10 illustrates another schematic diagram of time-frequency resources occupied by a first information block, as shown in FIG. 10.

In Embodiment 10, the first information block is transmitted in a third time-frequency resource block, and a number of bits comprised in the first information block is used for determining the third time-frequency resource block.

In one embodiment, the first time-frequency resource block is a time-frequency resource block in a first time-frequency resource block set, a number of bits comprised in the first sub-information-block is used for determining the first time-frequency resource block set out of the N time-frequency resource block sets; the third time-frequency resource block is a time-frequency resource block in a third time-frequency resource block set, the third time-frequency resource block set being one of the N time-frequency resource block sets; a number of bits comprised in the first information block is used for determining the third time-frequency resource block set out of the N time-frequency resource block sets; any of the N time-frequency resource block sets comprises a positive integer number of time-frequency resource block(s), N being a positive integer greater than 1.

In one subembodiment, the first information block comprises only the first sub-information-block of the first sub-information-block and the second sub-information-block, and a number of bits comprised in the first information block is equal to a number of bits comprised in the first sub-information-block, the first time-frequency resource block set is the same as the third time-frequency resource block set, and the first time-frequency resource block is the same as the third time-frequency resource block.

In one subembodiment, the first information block comprises the first sub-information-block and the second sub-information-block, and a number of bits comprised in the first information block is equal to a sum of a number of bits comprised in the first sub-information-block and a number of bits comprised in the second sub-information-block.

In one subembodiment, the first signaling is used for indicating the first time-frequency resource block from the first time-frequency resource block set.

In one subembodiment, the first signaling indicates an index of the first time-frequency resource block in the first time-frequency resource block set.

In one subembodiment, the first signaling is used for indicating the third time-frequency resource block from the third time-frequency resource block set.

In one subembodiment, the first signaling indicates an index of the third time-frequency resource block in the third time-frequency resource block set.

In one subembodiment, the fourth field comprised in the first signaling indicates a first index, the first index is equal to an index of the first time-frequency resource block in the first time-frequency resource block set, and the first index is equal to an index of the third time-frequency resource block in the third time-frequency resource block set.

In one subembodiment, the first signaling comprises a fourth field and a fifth field, the fourth field comprised in the first signaling indicates an index of the first time-frequency resource block in the first time-frequency resource block set, and the fifth field comprised in the first signaling indicates an index of the third time-frequency resource block in the third time-frequency resource block set.

Embodiment 11

Figure 11:
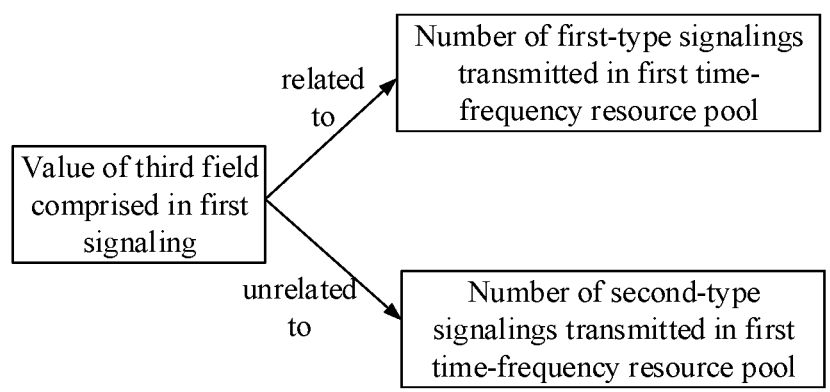
FIG. 11 illustrates a schematic diagram of a third field according to one embodiment of the present disclosure.

Embodiment 11 illustrates a schematic diagram of a third field, as shown in FIG. 11.

In Embodiment 11, when the first signaling of the present disclosure is one of the first-type signalings of the present disclosure, the first signaling comprises a third field; a value of the third field comprised in the first signaling is related to a number of the first-type signalings transmitted in the first time-frequency resource pool of the present disclosure, and unrelated to a number of the second-type signalings of the present disclosure transmitted in the first time-frequency resource pool.

In one embodiment, the third field comprises a positive integer number of bit(s).

In one embodiment, the third field comprises a Downlink assignment index field, and the detailed definition of the Downlink assignment index field can be found in 3GPP TS38.212, section 7.3.1.2.

In one embodiment, a value of the third field indicates a total DAI of the first-type signalings.

In one embodiment, the first signaling is one of the first-type signalings, and a value of the third field in the first signaling indicates a number of the first-type signalings transmitted in the first time-frequency resource pool.

In one embodiment, the first signaling is one of the first-type signalings, and a number of the first-type signalings transmitted in the first time-frequency resource pool is used for determining a value of the third field in the first signaling.

In one embodiment, the first signaling is one of the first-type signalings, and a value of the third field in the first signaling does not indicate a number of the first-type signalings transmitted in the first time-frequency resource pool.

In one embodiment, the first signaling is one of the first-type signalings, and a number of the second-type signalings transmitted in the first time-frequency resource pool is not used for determining a value of the third field in the first signaling.

In one embodiment, a value of the third field comprised in the first signaling indicates the L1.

In one embodiment, a value of the third field comprised in the first signaling indicates a positive integer no less than the L1.

In one embodiment, a value of the first field comprised in the first signaling and a value of the third field comprised in the first signaling are jointly used for determining the number of the second-type signalings transmitted in the first time-frequency resource pool.

In one embodiment, a difference between a value of the first field comprised in the first signaling and a value of the third field comprised in the first signaling is equal to the number of the second-type signalings transmitted in the first time-frequency resource pool.

In one embodiment, one of the first-type signalings comprises the third field.

In one embodiment, one of the second-type signalings does not comprise the third field.

In one embodiment, when the first signaling is one of the second-type signalings, the first signaling does not comprise the third field.

Embodiment 12

Figure 12:
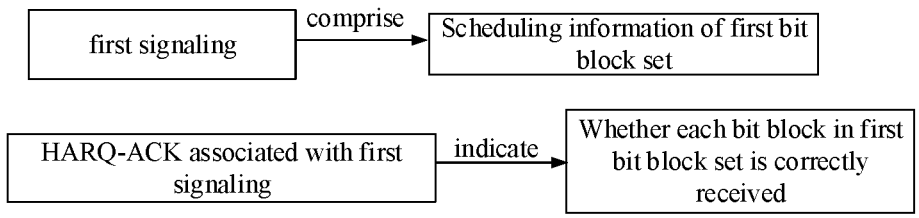
FIG. 12 illustrates a schematic diagram of a HARQ-ACK associated with a first signaling according to one embodiment of the present disclosure.

Embodiment 12 illustrates a schematic diagram of a HARQ-ACK associated with a first signaling, as shown in FIG. 12.

In Embodiment 12, the first signaling comprises scheduling information of the first bit block set in the present disclosure; the HARQ-ACK associated with the first signaling indicates whether each bit block in the first bit block set is correctly received.

In one embodiment, the first bit block set comprises a positive integer number of Transport Block(s) (TB).

In one embodiment, the first bit block set comprises a TB.

In one embodiment, the first bit block set comprises a positive integer number of CBG(s).

In one embodiment, the first bit block set comprises a positive integer number of bit(s).

In one embodiment, the scheduling information of the first bit block set comprises at least one of time-domain resources occupied, frequency-domain resources occupied, a Modulation and Coding Scheme (MCS), configuration information of DeModulation Reference Signals (DMRS), a Hybrid Automatic Repeat reQuest (HARQ) process ID, a Redundancy Version (RV), a New Data Indicator (NDI), a transmission antenna port or a corresponding Transmission Configuration Indicator (TCI) state.

In one subembodiment, the configuration information of the DMRS comprises at least one of a Reference Signal (RS) sequence, a mapping mode, a DMRS type, time-domain resources occupied, frequency-domain resources occupied, code-domain resources occupied, a cyclic shift or an Orthogonal Cover Code (OCC).

Embodiment 13

Figure 13:
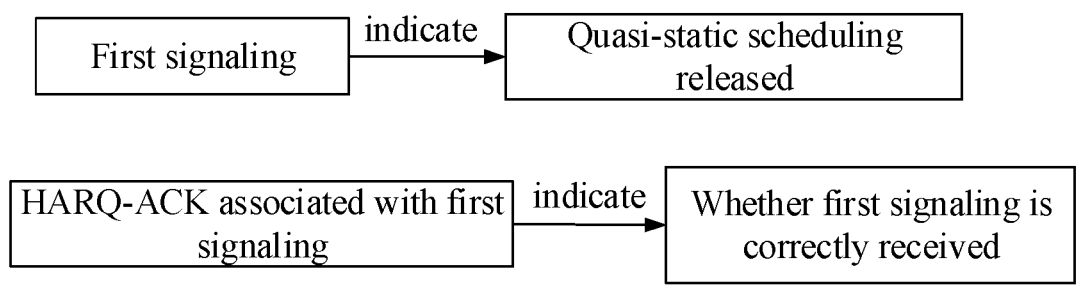
FIG. 13 illustrates a schematic diagram of a HARQ-ACK associated with a first signaling according to another embodiment of the present disclosure.

Embodiment 13 illustrates another schematic diagram of a HARQ-ACK associated with a first signaling, as shown in FIG. 13.

In Embodiment 13, the first signaling is used for indicating SPS Release, and the HARQ-ACK associated with the first signaling indicates whether the first signaling is correctly received.

In one embodiment, a value of a field in the first signaling indicates SPS Release.

In one embodiment, values of multiple fields in the first signaling indicate SPS Release.

Embodiment 14

Figure 14:
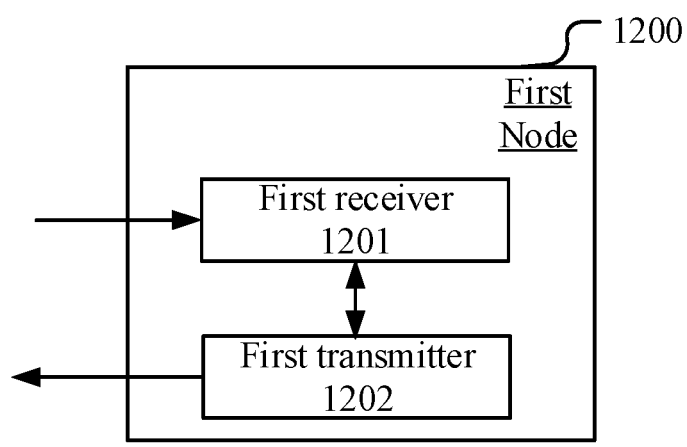
FIG. 14 illustrates a structure block diagram of a processing device in a first node according to one embodiment of the present disclosure.

Embodiment 14 illustrates a structure block diagram of a processing device in a first node, as shown in FIG. 14. In FIG. 14, a first node's processing device 1200 comprises a first receiver 1201 and a first transmitter 1202.

In one embodiment, the first node 1200 is a UE.

In one embodiment, the first node 1200 is a relay node.

In one embodiment, the first node 1200 is vehicle-mounted communication equipment.

In one embodiment, the first node 1200 is a UE supporting V2X communications.

In one embodiment, the first node 1200 is a relay node supporting V2X communications.

In one embodiment, the first receiver 1201 comprises at least one of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1201 comprises at least the first five of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201 comprises at least the first four of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201 comprises at least the first three of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201 comprises at least the first two of the antenna 452, the receiver 454, the multi-antenna receiving processor 458, the receiving processor 456, the controller/processor 459, the memory 460 and the data source 467 in FIG. 4 of the present disclosure.

In one embodiment, the first transmitter 1202 comprises at least one of the antenna 452, the transmitter 454, the multi-antenna transmitting processor 457, the transmitting processor 468, the controller/processor 459, the memory 460 or the data source 467 in FIG. 4 of the present disclosure.

In one embodiment, the first transmitter 1202 comprises at least the first five of the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1202 comprises at least the first four of the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1202 comprises at least the first three of the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1202 comprises at least the first two of the antenna 452, the transmitter 454, the multi-antenna transmitting processor 457, the transmitting processor 468, the controller/processor 459, the memory 460 and the data source 467 in FIG. 4 of the present disclosure.

The first receiver 1201 monitors first-type signalings and second-type signalings in a first time-frequency resource pool, and receives a first signaling.

The first transmitter 1202 transmits a first information block.

In Embodiment 14, the first information block comprises a HARQ-ACK associated with the first signaling; each of the first-type signalings and the second-type signalings comprises a first field; and each of the first-type signalings and the second-type signalings comprises a second field, the second field comprised by each of the first-type signalings indicates a first priority, and the second field comprised by each of the second-type signalings indicates a second priority, the first priority being different from the second priority; when the first signaling is one of the first-type signalings, a value of the first field comprised in the first signaling is related to both a number of the first-type signalings and a number of the second-type signalings transmitted in the first time-frequency resource pool; when the first signaling is one of the second-type signalings, a value of the first field comprised in the first signaling is related to the number of the second-type signalings transmitted in the first time-frequency resource pool, and unrelated to the number of the first-type signalings transmitted in the first time-frequency resource pool.

In one embodiment, the first receiver 1201 also receives a second signaling in the first time-frequency resource pool; herein, the first signaling is one of the first-type signalings, and the second signaling is one of the second-type signalings; a first sub-information-block comprises the HARQ-ACK associated with the first signaling, and the first sub-information-block belongs to the first information block, while a second sub-information-block comprises a HARQ-ACK associated with the second signaling; the first signaling indicates a first time-frequency resource block, while the second signaling indicates a second time-frequency resource block, the first time-frequency resource block being reserved for the first sub-information-block, and the second time-frequency resource block being reserved for the second sub-information-block; whether a time unit to which the first time-frequency resource block belongs in time domain is overlapped with a time unit to which the second time-frequency resource block belongs in time domain is used for determining whether the first information block comprises the second sub-information-block, or, whether the first time-frequency resource block is overlapped with the second time-frequency resource block in time domain is used for determining whether the first information block comprises the second sub-information-block.

In one embodiment, the first receiver 1201 also receives L1-1 first-type signaling(s) in a first signaling set other than the first signaling and L2-1 second-type signaling(s) in a second signaling set other than the second signaling in the first time-frequency resource pool; herein, the first signaling set is composed of L1 first-type signalings detected in the first time-frequency resource pool, and the first signaling is a last first-type signaling in the first signaling set, L1 being a positive integer greater than 1; the first sub-information-block comprises L1 information sub-blocks, and the L1 first-type signalings respectively correspond to the L1 information sub-blocks, the L1 information sub-blocks respectively comprising HARQ-ACKs associated with corresponding first-type signalings; the second signaling set is composed of L2 second-type signalings detected in the first time-frequency resource pool, and the second signaling is a last second-type signaling in the second signaling set, L2 being a positive integer greater than 1; the second sub-information-block comprises L2 information sub-blocks, and the L2 second-type signalings respectively correspond to the L2 information sub-blocks, the L2 information sub-blocks respectively comprising HARQ-ACKs associated with corresponding second-type signalings.

In one embodiment, the first information block is transmitted in the first time-frequency resource block.

In one embodiment, when the first signaling is one of the first-type signalings, the first signaling comprises a third field; a value of the third field comprised in the first signaling is related to a number of the first-type signalings transmitted in the first time-frequency resource pool, and unrelated to a number of the second-type signalings transmitted in the first time-frequency resource pool.

In one embodiment, the first receiver 1201 also receives a first bit block set; herein, the first signaling comprises scheduling information of the first bit block set; the HARQ-ACK associated with the first signaling indicates whether each bit block in the first bit block set is correctly received.

In one embodiment, the first signaling is used for indicating SPS Release, and the HARQ-ACK associated with the first signaling indicates whether the first signaling is correctly received.

Embodiment 15

Figure 15:
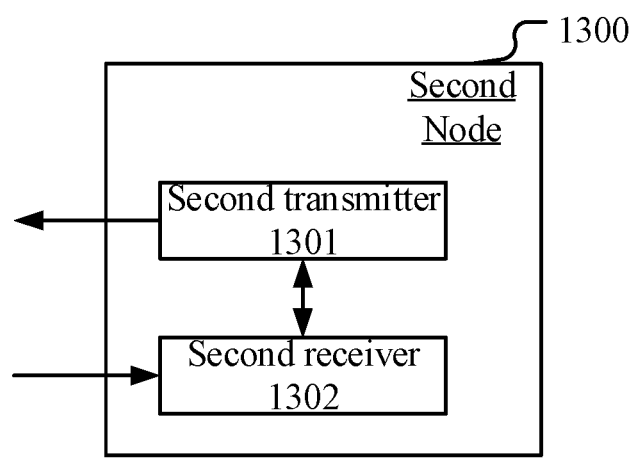
FIG. 15 illustrates a structure block diagram of a processing device in a second node according to one embodiment of the present disclosure.

Embodiment 15 illustrates a structure block diagram of a processing device in a second node, as shown in FIG. 15. In FIG. 15, a second node's processing device 1300 comprises a second transmitter 1301 and a second receiver 1302.

In one embodiment, the second node 1300 is a UE.

In one embodiment, the second node 1300 is a base station.

In one embodiment, the second node 1300 is a relay node.

In one embodiment, the second transmitter 1301 comprises at least one of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first five of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301 comprises at least the first four of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301 comprises at least the first three of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301 comprises at least the first two of the antenna 420, the transmitter 418, the multi-antenna transmitting processor 471, the transmitting processor 416, the controller/processor 475 and the memory 476 in FIG. 4 of the present disclosure.

In one embodiment, the second receiver 1302 comprises at least one of the antenna 420, the receiver 418, the multi-antenna receiving processor 472, the receiving processor 470, the controller/processor 475 or the memory 476 in FIG. 4 of the present disclosure.

In one embodiment, the second receiver 1302 comprises at least the first five of the antenna 420, the receiver 418, the multi-antenna receiving processor 472, the receiving processor 470, the controller/processor 475 and the memory 476 in FIG. 4 of the present disclosure.

In one embodiment, the second receiver 1302 comprises at least the first four of the antenna 420, the receiver 418, the multi-antenna receiving processor 472, the receiving processor 470, the controller/processor 475 and the memory 476 in FIG. 4 of the present disclosure.

In one embodiment, the second receiver 1302 comprises at least the first three of the antenna 420, the receiver 418, the multi-antenna receiving processor 472, the receiving processor 470, the controller/processor 475 and the memory 476 in FIG. 4 of the present disclosure.

In one embodiment, the second receiver 1302 comprises at least the first two of the antenna 420, the receiver 418, the multi-antenna receiving processor 472, the receiving processor 470, the controller/processor 475 and the memory 476 in FIG. 4 of the present disclosure.

The second transmitter 1301 transmits a first signaling in a first time-frequency resource pool.

The second receiver 1302 receives a first information block.

In Embodiment 15, the first information block comprises a HARQ-ACK associated with the first signaling; the first time-frequency resource pool is reserved for first-type signalings and second-type signalings; each of the first-type signalings and the second-type signalings comprises a first field; and each of the first-type signalings and the second-type signalings comprises a second field, the second field comprised by each of the first-type signalings indicates a first priority, and the second field comprised by each of the second-type signalings indicates a second priority, the first priority being different from the second priority; when the first signaling is one of the first-type signalings, a value of the first field comprised in the first signaling is related to both a number of the first-type signalings and a number of the second-type signalings transmitted in the first time-frequency resource pool; when the first signaling is one of the second-type signalings, a value of the first field comprised in the first signaling is related to the number of the second-type signalings transmitted in the first time-frequency resource pool, and unrelated to the number of the first-type signalings transmitted in the first time-frequency resource pool.

In one embodiment, the second transmitter 1301 also transmits a second signaling in the first time-frequency resource pool; herein, the first signaling is one of the first-type signalings, and the second signaling is one of the second-type signalings; a first sub-information-block comprises the HARQ-ACK associated with the first signaling, and the first sub-information-block belongs to the first information block, while a second sub-information-block comprises a HARQ-ACK associated with the second signaling; the first signaling indicates a first time-frequency resource block, while the second signaling indicates a second time-frequency resource block, the first time-frequency resource block being reserved for the first sub-information-block, and the second time-frequency resource block being reserved for the second sub-information-block; whether a time unit to which the first time-frequency resource block belongs in time domain is overlapped with a time unit to which the second time-frequency resource block belongs in time domain is used for determining whether the first information block comprises the second sub-information-block, or, whether the first time-frequency resource block is overlapped with the second time-frequency resource block in time domain is used for determining whether the first information block comprises the second sub-information-block.

In one embodiment, the second transmitter 1301 also transmits L1-1 first-type signaling(s) in a first signaling set other than the first signaling and L2-1 second-type signaling(s) in a second signaling set other than the second signaling in the first time-frequency resource pool; herein, the first signaling set is composed of L1 first-type signalings detected in the first time-frequency resource pool, and the first signaling is a last first-type signaling in the first signaling set, L1 being a positive integer greater than 1; the first sub-information-block comprises L1 information sub-blocks, and the L1 first-type signalings respectively correspond to the L1 information sub-blocks, the L1 information sub-blocks respectively comprising HARQ-ACKs associated with corresponding first-type signalings; the second signaling set is composed of L2 second-type signalings detected in the first time-frequency resource pool, and the second signaling is a last second-type signaling in the second signaling set, L2 being a positive integer greater than 1; the second sub-information-block comprises L2 information sub-blocks, and the L2 second-type signalings respectively correspond to the L2 information sub-blocks, the L2 information sub-blocks respectively comprising HARQ-ACKs associated with corresponding second-type signalings.

In one embodiment, the first information block is transmitted in the first time-frequency resource block.

In one embodiment, when the first signaling is one of the first-type signalings, the first signaling comprises a third field; a value of the third field comprised in the first signaling is related to a number of the first-type signalings transmitted in the first time-frequency resource pool, and unrelated to a number of the second-type signalings transmitted in the first time-frequency resource pool.

In one embodiment, the second transmitter 1301 also transmits a first bit block set; herein, the first signaling comprises scheduling information of the first bit block set; the HARQ-ACK associated with the first signaling indicates whether each bit block in the first bit block set is correctly received.

In one embodiment, the first signaling is used for indicating SPS Release, and the HARQ-ACK associated with the first signaling indicates whether the first signaling is correctly received.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network-side equipment includes but is not limited to macro-cellular base stations, micro-cellular base stations, home base stations, relay base station, eNB, gNB, Transmitter Receiver Point (TRP), GNSS, relay satellite, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, monitoring first-type signalings and second-type signalings in a first time-frequency resource pool, and receiving a first signaling; and
a first transmitter, transmitting a first information block;
wherein the first information block comprises a HARQ-ACK associated with the first signaling; each of the first-type signalings and the second-type signalings comprises a first field; and each of the first-type signalings and the second-type signalings comprises a second field, the second field comprised by each of the first-type signalings indicates a first priority, and the second field comprised by each of the second-type signalings indicates a second priority, the first priority being different from the second priority; when the first signaling is one of the first-type signalings, a value of the first field comprised in the first signaling is related to both a number of the first-type signalings and a number of the second-type signalings transmitted in the first time-frequency resource pool; when the first signaling is one of the second-type signalings, a value of the first field comprised in the first signaling is related to the number of the second-type signalings transmitted in the first time-frequency resource pool, and unrelated to the number of the first-type signalings transmitted in the first time-frequency resource pool.

2. The first node according to claim 1, wherein the first receiver also receives a second signaling in the first time-frequency resource pool; wherein the first signaling is one of the first-type signalings, and the second signaling is one of the second-type signalings; a first sub-information-block comprises the HARQ-ACK associated with the first signaling, and the first sub-information-block belongs to the first information block, while a second sub-information-block comprises a HARQ-ACK associated with the second signaling; the first signaling indicates a first time-frequency resource block, while the second signaling indicates a second time-frequency resource block, the first time-frequency resource block being reserved for the first sub-information-block, and the second time-frequency resource block being reserved for the second sub-information-block; whether a time unit to which the first time-frequency resource block belongs in time domain is overlapped with a time unit to which the second time-frequency resource block belongs in time domain is used for determining whether the first information block comprises the second sub-information-block, or, whether the first time-frequency resource block is overlapped with the second time-frequency resource block in time domain is used for determining whether the first information block comprises the second sub-information-block.

3. The first node according to claim 2, wherein the first receiver also receives L1-1 first-type signaling(s) in a first signaling set other than the first signaling and L2-1 second-type signaling(s) in a second signaling set other than the second signaling in the first time-frequency resource pool; wherein the first signaling set is composed of L1 first-type signalings detected in the first time-frequency resource pool, and the first signaling is a last first-type signaling in the first signaling set, L1 being a positive integer greater than 1; the first sub-information-block comprises L1 information sub-blocks, and the L1 first-type signalings respectively correspond to the L1 information sub-blocks, the L1 information sub-blocks respectively comprising HARQ-ACKs associated with corresponding first-type signalings; the second signaling set is composed of L2 second-type signalings detected in the first time-frequency resource pool, and the second signaling is a last second-type signaling in the second signaling set, L2 being a positive integer greater than 1; the second sub-information-block comprises L2 information sub-blocks, and the L2 second-type signalings respectively correspond to the L2 information sub-blocks, the L2 information sub-blocks respectively comprising HARQ-ACKs associated with corresponding second-type signalings.

4. The first node according to claim 2, wherein the first information block is transmitted in the first time-frequency resource block.

5. The first node according to claim 1, wherein when the first signaling is one of the first-type signalings, the first signaling comprises a third field; a value of the third field comprised in the first signaling is related to a number of the first-type signalings transmitted in the first time-frequency resource pool, and unrelated to a number of the second-type signalings transmitted in the first time-frequency resource pool.

6. A second node for wireless communications, comprising:
a second transmitter, transmitting a first signaling in a first time-frequency resource pool; and
a second receiver, receiving a first information block;
wherein the first information block comprises a HARQ-ACK associated with the first signaling; the first time-frequency resource pool is reserved for first-type signalings and second-type signalings; each of the first-type signalings and the second-type signalings comprises a first field; and each of the first-type signalings and the second-type signalings comprises a second field, the second field comprised by each of the first-type signalings indicates a first priority, and the second field comprised by each of the second-type signalings indicates a second priority, the first priority being different from the second priority; when the first signaling is one of the first-type signalings, a value of the first field comprised in the first signaling is related to both a number of the first-type signalings and a number of the second-type signalings transmitted in the first time-frequency resource pool; when the first signaling is one of the second-type signalings, a value of the first field comprised in the first signaling is related to the number of the second-type signalings transmitted in the first time-frequency resource pool, and unrelated to the number of the first-type signalings transmitted in the first time-frequency resource pool.

7. The second node according to claim 6, wherein the second transmitter also transmits a second signaling in the first time-frequency resource pool; wherein the first signaling is one of the first-type signalings, and the second signaling is one of the second-type signalings; a first sub-information-block comprises the HARQ-ACK associated with the first signaling, and the first sub-information-block belongs to the first information block, while a second sub-information-block comprises a HARQ-ACK associated with the second signaling; the first signaling indicates a first time-frequency resource block, while the second signaling indicates a second time-frequency resource block, the first time-frequency resource block being reserved for the first sub-information-block, and the second time-frequency resource block being reserved for the second sub-information-block; whether a time unit to which the first time-frequency resource block belongs in time domain is overlapped with a time unit to which the second time-frequency resource block belongs in time domain is used for determining whether the first information block comprises the second sub-information-block, or, whether the first time-frequency resource block is overlapped with the second time-frequency resource block in time domain is used for determining whether the first information block comprises the second sub-information-block.

8. The second node according to claim 7, wherein the second transmitter also transmits L1-1 first-type signaling(s) in a first signaling set other than the first signaling and L2-1 second-type signaling(s) in a second signaling set other than the second signaling in the first time-frequency resource pool; wherein the first signaling set is composed of L1 first-type signalings detected in the first time-frequency resource pool, and the first signaling is a last first-type signaling in the first signaling set, L1 being a positive integer greater than 1; the first sub-information-block comprises L1 information sub-blocks, and the L1 first-type signalings respectively correspond to the L1 information sub-blocks, the L1 information sub-blocks respectively comprising HARQ-ACKs associated with corresponding first-type signalings; the second signaling set is composed of L2 second-type signalings detected in the first time-frequency resource pool, and the second signaling is a last second-type signaling in the second signaling set, L2 being a positive integer greater than 1; the second sub-information-block comprises L2 information sub-blocks, and the L2 second-type signalings respectively correspond to the L2 information sub-blocks, the L2 information sub-blocks respectively comprising HARQ-ACKs associated with corresponding second-type signalings.

9. The second node according to claim 7, wherein the first information block is transmitted in the first time-frequency resource block.

10. The second node according to claim 6, wherein when the first signaling is one of the first-type signalings, the first signaling comprises a third field; a value of the third field comprised in the first signaling is related to a number of the first-type signalings transmitted in the first time-frequency resource pool, and unrelated to a number of the second-type signalings transmitted in the first time-frequency resource pool.

11. A method in a first node for wireless communications, comprising:
  monitoring first-type signalings and second-type signalings in a first time-frequency resource pool, and receiving a first signaling; and
  transmitting a first information block;
  wherein the first information block comprises a HARQ-ACK associated with the first signaling; each of the first-type signalings and the second-type signalings comprises a first field; and each of the first-type signalings and the second-type signalings comprises a second field, the second field comprised by each of the first-type signalings indicates a first priority, and the second field comprised by each of the second-type signalings indicates a second priority, the first priority being different from the second priority; when the first signaling is one of the first-type signalings, a value of the first field comprised in the first signaling is related to both a number of the first-type signalings and a number of the second-type signalings transmitted in the first time-frequency resource pool; when the first signaling is one of the second-type signalings, a value of the first field comprised in the first signaling is related to the number of the second-type signalings transmitted in the first time-frequency resource pool, and unrelated to the number of the first-type signalings transmitted in the first time-frequency resource pool.

12. The method according to claim 11, comprising:
  receiving a second signaling in the first time-frequency resource pool;
  wherein the first signaling is one of the first-type signalings, and the second signaling is one of the second-type signalings; a first sub-information-block comprises the HARQ-ACK associated with the first signaling, and the first sub-information-block belongs to the first information block, while a second sub-information-block comprises a HARQ-ACK associated with the second signaling; the first signaling indicates a first time-frequency resource block, while the second signaling indicates a second time-frequency resource block, the first time-frequency resource block being reserved for the first sub-information-block, and the second time-frequency resource block being reserved for the second sub-information-block; whether a time unit to which the first time-frequency resource block belongs in time domain is overlapped with a time unit to which the second time-frequency resource block belongs in time domain is used for determining whether the first information block comprises the second sub-information-block, or, whether the first time-frequency resource block is overlapped with the second time-frequency resource block in time domain is used for determining whether the first information block comprises the second sub-information-block.

13. The method according to claim 12, comprising:
  receiving L1-1 first-type signaling(s) in a first signaling set other than the first signaling and L2-1 second-type signaling(s) in a second signaling set other than the second signaling in the first time-frequency resource pool;
  wherein the first signaling set is composed of L1 first-type signalings detected in the first time-frequency resource pool, and the first signaling is a last first-type signaling in the first signaling set, L1 being a positive integer greater than 1; the first sub-information-block comprises L1 information sub-blocks, and the L1 first-type signalings respectively correspond to the L1 information sub-blocks, the L1 information sub-blocks respectively comprising HARQ-ACKs associated with corresponding first-type signalings; the second signaling set is composed of L2 second-type signalings detected in the first time-frequency resource pool, and the second signaling is a last second-type signaling in the second signaling set, L2 being a positive integer greater than 1; the second sub-information-block comprises L2 information sub-blocks, and the L2 second-type signalings respectively correspond to the L2 information sub-blocks, the L2 information sub-blocks respectively comprising HARQ-ACKs associated with corresponding second-type signalings.

14. The method according to claim 12, wherein the first information block is transmitted in the first time-frequency resource block.

15. The method according to claim 11, wherein when the first signaling is one of the first-type signalings, the first signaling comprises a third field; a value of the third field comprised in the first signaling is related to a number of the first-type signalings transmitted in the first time-frequency resource pool, and unrelated to a number of the second-type signalings transmitted in the first time-frequency resource pool.

16. A method in a second node for wireless communications, comprising:
  transmitting a first signaling in a first time-frequency resource pool; and
  receiving a first information block;
  wherein the first information block comprises a HARQ-ACK associated with the first signaling; the first time-frequency resource pool is reserved for first-type signalings and second-type signalings; each of the first-type signalings and the second-type signalings comprises a first field; and each of the first-type signalings and the second-type signalings comprises a second field, the second field comprised by each of the first-type signalings indicates a first priority, and the second field comprised by each of the second-type signalings indicates a second priority, the first priority being different from the second priority; when the first signaling is one of the first-type signalings, a value of the first field comprised in the first signaling is related to both a number of the first-type signalings and a number of the second-type signalings transmitted in the first time-frequency resource pool; when the first signaling is one of the second-type signalings, a value of the first field comprised in the first signaling is related to the number of the second-type signalings transmitted in the first time-frequency resource pool, and unrelated to the number of the first-type signalings transmitted in the first time-frequency resource pool.

17. The method according to claim 16, comprising:
transmitting a second signaling in the first time-frequency resource pool;
wherein the first signaling is one of the first-type signalings, and the second signaling is one of the second-type signalings; a first sub-information-block comprises the HARQ-ACK associated with the first signaling, and the first sub-information-block belongs to the first information block, while a second sub-information-block comprises a HARQ-ACK associated with the second signaling; the first signaling indicates a first time-frequency resource block, while the second signaling indicates a second time-frequency resource block, the first time-frequency resource block being reserved for the first sub-information-block, and the second time-frequency resource block being reserved for the second sub-information-block; whether a time unit to which the first time-frequency resource block belongs in time domain is overlapped with a time unit to which the second time-frequency resource block belongs in time domain is used for determining whether the first information block comprises the second sub-information-block, or, whether the first time-frequency resource block is overlapped with the second time-frequency resource block in time domain is used for determining whether the first information block comprises the second sub-information-block.

18. The method according to claim 17, comprising:
transmitting L1-1 first-type signaling(s) in a first signaling set other than the first signaling and L2-1 second-type signaling(s) in a second signaling set other than the second signaling in the first time-frequency resource pool;
wherein the first signaling set is composed of L1 first-type signalings detected in the first time-frequency resource pool, and the first signaling is a last first-type signaling in the first signaling set, L1 being a positive integer greater than 1; the first sub-information-block comprises L1 information sub-blocks, and the L1 first-type signalings respectively correspond to the L1 information sub-blocks, the L1 information sub-blocks respectively comprising HARQ-ACKs associated with corresponding first-type signalings; the second signaling set is composed of L2 second-type signalings detected in the first time-frequency resource pool, and the second signaling is a last second-type signaling in the second signaling set, L2 being a positive integer greater than 1; the second sub-information-block comprises L2 information sub-blocks, and the L2 second-type signalings respectively correspond to the L2 information sub-blocks, the L2 information sub-blocks respectively comprising HARQ-ACKs associated with corresponding second-type signalings.

19. The method according to claim 17, wherein the first information block is transmitted in the first time-frequency resource block.

20. The method according to claim 16, wherein when the first signaling is one of the first-type signalings, the first signaling comprises a third field; a value of the third field comprised in the first signaling is related to a number of the first-type signalings transmitted in the first time-frequency resource pool, and unrelated to a number of the second-type signalings transmitted in the first time-frequency resource pool.

* * * * *